US012214484B2

(12) United States Patent
Hasegawa et al.

(10) Patent No.: US 12,214,484 B2
(45) Date of Patent: Feb. 4, 2025

(54) DEVICE CONTROL APPARATUS, DEVICE CONTROL METHOD, AND RECORDING MEDIUM

(71) Applicant: CASIO COMPUTER CO., LTD., Tokyo (JP)

(72) Inventors: Hirokazu Hasegawa, Koganei (JP); Miyuki Urano, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 314 days.

(21) Appl. No.: 17/666,832

(22) Filed: Feb. 8, 2022

(65) Prior Publication Data
US 2022/0297307 A1 Sep. 22, 2022

(30) Foreign Application Priority Data
Mar. 16, 2021 (JP) .................. 2021-042124

(51) Int. Cl.
*B25J 11/00* (2006.01)
*B25J 9/16* (2006.01)
*G06N 3/008* (2023.01)

(52) U.S. Cl.
CPC ............. *B25J 11/001* (2013.01); *B25J 9/162* (2013.01); *G06N 3/008* (2013.01)

(58) Field of Classification Search
CPC .......... B25J 11/001; B25J 9/162; G06N 3/008
See application file for complete search history.

(56) References Cited

U.S. PATENT DOCUMENTS

| 2002/0103576 A1* | 8/2002 | Takamura | ............... B25J 9/163 |
| | | | 700/245 |
| 2003/0014159 A1* | 1/2003 | Inoue | ..................... A63H 11/20 |
| | | | 700/245 |

(Continued)

FOREIGN PATENT DOCUMENTS

| JP | 2003071763 A | 3/2003 |
| JP | 2003285286 A | 10/2003 |

OTHER PUBLICATIONS

Japanese Office Action (and English language translation thereof) dated Nov. 29, 2022, issued in counterpart Japanese Application No. 2021-042124.

*Primary Examiner* — Jaime Figueroa
*Assistant Examiner* — Mohamad O El Sayah
(74) *Attorney, Agent, or Firm* — Holtz, Holtz & Volek PC

(57) ABSTRACT

A device control apparatus includes at least one processor executing a program stored in at least one memory. The at least one processor determines whether a predetermined condition related to a simulated growth degree of a device is satisfied, acquires external stimulus data representing an external stimulus externally applied to the device, changes and sets basic character data according to a first condition based on the acquired external stimulus data in a case where the predetermined condition is not satisfied, corrects the basic character data according to a second condition, different from the first condition and based on the acquired external stimulus data, to obtain character data in a case where the predetermined condition is satisfied, controls a movement of the device according to the basic character data in the case where the predetermined condition is not satisfied, and controls a movement of the device according to the character data obtained by the correction in the case where the predetermined condition is satisfied.

12 Claims, 20 Drawing Sheets

(56) References Cited

U.S. PATENT DOCUMENTS

| | | | | |
|---|---|---|---|---|
| 2006/0041332 A1* | 2/2006 | Sabe | ............... | G06N 3/008 |
| | | | | 700/245 |
| 2011/0004577 A1* | 1/2011 | Jung | ............... | G06N 3/004 |
| | | | | 706/54 |
| 2014/0093849 A1* | 4/2014 | Ahn | ............... | G06N 3/008 |
| | | | | 434/236 |
| 2019/0224853 A1* | 7/2019 | Gewecke | ............... | B25J 11/001 |
| 2020/0406469 A1* | 12/2020 | Ogawa | ............... | G10L 17/06 |
| 2021/0170585 A1* | 6/2021 | Kim | ............... | B25J 11/0015 |

* cited by examiner

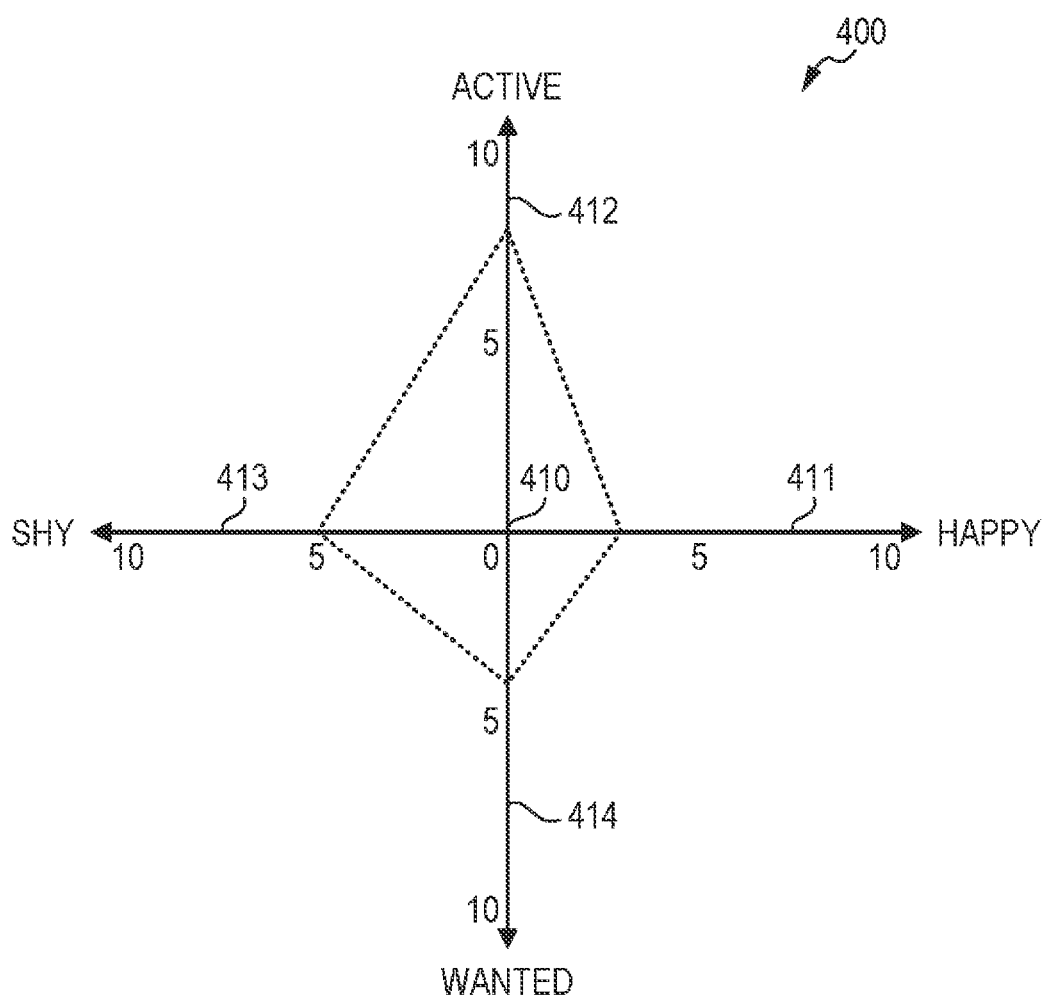

FIG. 12

| MOVEMENT TRIGGER | MOVEMENT TYPE | GROWTH VALUE | | | | | | | | | | |
|---|---|---|---|---|---|---|---|---|---|---|---|---|
| | | 0 | 1 | 2 | 3 | 4 | 5 | 6 | 7 | 8 | 9 | 10 |
| BODY IS STROKED | BASIC MOVEMENT 0-0 | 100 | 100 | 80 | 80 | 30 | 30 | 20 | 20 | 20 | 20 | 10 |
| | BASIC MOVEMENT 0-1 | 0 | 0 | 20 | 20 | 50 | 50 | 20 | 20 | 20 | 20 | 10 |
| | BASIC MOVEMENT 0-2 | 0 | 0 | 0 | 0 | 20 | 20 | 40 | 40 | 20 | 20 | 20 |
| | BASIC MOVEMENT 0-3 | 0 | 0 | 0 | 0 | 0 | 0 | 20 | 20 | 20 | 20 | 20 |
| | CHARACTER MOVEMENT 0-0 | 0 | 0 | 0 | 0 | 0 | 0 | 0 | 0 | 20 | 20 | 40 |
| CONVERSION IS INITIATED | BASIC MOVEMENT 1-0 | 100 | 90 | 80 | 80 | 60 | 60 | 30 | 30 | 30 | 30 | 30 |
| | BASIC MOVEMENT 1-1 | 0 | 10 | 20 | 20 | 40 | 40 | 50 | 50 | 40 | 40 | 30 |
| | CHARACTER MOVEMENT 1-0 | 0 | 0 | 0 | 0 | 0 | 0 | 20 | 20 | 30 | 30 | 40 |
| HEARING LOUD SOUND | BASIC MOVEMENT 2-0 | 100 | 90 | 80 | 80 | 60 | 60 | 30 | 30 | 20 | 20 | 20 |
| | BASIC MOVEMENT 2-1 | 0 | 10 | 20 | 20 | 40 | 40 | 50 | 50 | 20 | 20 | 20 |
| | BASIC MOVEMENT 2-2 | 0 | 0 | 0 | 0 | 0 | 0 | 20 | 20 | 40 | 40 | 20 |
| | CHARACTER MOVEMENT 2-0 | 0 | 0 | 0 | 0 | 0 | 0 | 0 | 0 | 20 | 20 | 40 |
| LAPSE OF FIXED PERIOD | BASIC MOVEMENT 3-0 | 100 | 90 | 80 | 80 | 60 | 60 | 30 | 30 | 20 | 20 | 20 |
| | BASIC MOVEMENT 3-1 | 0 | 10 | 20 | 20 | 40 | 40 | 50 | 50 | 20 | 20 | 20 |
| | BASIC MOVEMENT 3-2 | 0 | 0 | 0 | 0 | 0 | 0 | 20 | 20 | 40 | 40 | 20 |
| | CHARACTER MOVEMENT 3-0 | 0 | 0 | 0 | 0 | 0 | 0 | 0 | 0 | 20 | 20 | 40 |
| ⋮ | ⋮ | ⋮ | ⋮ | ⋮ | ⋮ | ⋮ | ⋮ | ⋮ | ⋮ | ⋮ | ⋮ | ⋮ |

*FIG. 13*

| MOVEMENT TYPE | CHARACTER TYPE | MOVEMENT CONTENT |
|---|---|---|
| BASIC MOVEMENT 0-0 | | YIPPING |
| BASIC MOVEMENT 0-1 | | WOOFING |
| BASIC MOVEMENT 0-2 | | MEOWING |
| BASIC MOVEMENT 0-3 | | WHINING |
| CHARACTER MOVEMENT 0-0 | HAPPY | HAPPILY YIPPING |
| | ACTIVE | VIGOROUSLY SINGING "RAT-TAT-TAT" |
| | SHY | COYLY GENERATING "PHEW" |
| | WANTED | WOOFING TO ATTRACT ATTENTION |
| BASIC MOVEMENT 1-0 | | ASKING "WHAT?" |
| BASIC MOVEMENT 1-1 | | SLOWLY ASKING "WHAT?" |
| CHARACTER MOVEMENT 1-0 | HAPPY | HAPPILY ASKING "WHAT?" |
| | ACTIVE | VIGOROUSLY ASKING "WHAT?" |
| | SHY | COYLY ASKING "WHAT?" |
| | WANTED | ASKING "WHAT?" TO ATTRACT ATTENTION |
| BASIC MOVEMENT 2-0 | | BLEEPING |
| BASIC MOVEMENT 2-1 | | OUTPUTTING "OOPS" |
| BASIC MOVEMENT 2-2 | | OUTPUTTING "WOW" LONG |
| CHARACTER MOVEMENT 2-0 | HAPPY | HAPPILY YELPING |
| | ACTIVE | VIGOROUSLY YELPING |
| | SHY | COYLY YELPING |
| | WANTED | YELPING TO ATTRACT ATTENTION |
| BASIC MOVEMENT 3-0 | | SLUGGISH MOVEMENT |
| BASIC MOVEMENT 3-1 | | MOVEMENT OF LOOKING AROUND |
| BASIC MOVEMENT 3-2 | | MOVEMENT OF YAWNING |
| CHARACTER MOVEMENT 3-0 | HAPPY | HAPPY MOVEMENT |
| | ACTIVE | VIGOROUS MOVEMENT |
| | SHY | COY MOVEMENT |
| | WANTED | MOVEMENT TO ATTRACT ATTENTION |
| ⋮ | ⋮ | ⋮ |

*FIG. 14*

| MOVEMENT TYPE | TIME (ms) | TWIST MOTOR | UP-AND-DOWN MOTOR | SOUND DATA |
|---|---|---|---|---|
| ⋮ | ⋮ | ⋮ | ⋮ | ⋮ |
| BASIC MOVEMENT 2-0 (IN CASE OF BEING STARTLED DUE TO LOUD SOUND) | 100 | 0 | 0 | SOUND DATA OF "BLEEP" SOUND |
| | 100 | 0 | -24 | |
| | 700 | 0 | -24 | |
| | 500 | 34 | -24 | |
| | 400 | -34 | -24 | |
| | 500 | 0 | 0 | |
| ⋮ | ⋮ | ⋮ | ⋮ | ⋮ |
| CHARACTER MOVEMENT 2-0 HAPPY (IN CASE OF BEING STARTLED DUE TO LOUD SOUND) | 100 | 0 | 0 | SOUND DATA OF HAPPILY YELPING SOUND |
| | 100 | 0 | -24 | |
| | 700 | 0 | -24 | |
| | 500 | 34 | -24 | |
| | 400 | -34 | -24 | |
| | 500 | 0 | 0 | |
| ⋮ | ⋮ | ⋮ | ⋮ | ⋮ |
| SPONTANEOUS MOVEMENT 0-0 (BREATHING MOVEMENT) | 750 | 0 | 30 | NO SOUND |
| | 800 | 0 | 24 | |
| ⋮ | ⋮ | ⋮ | ⋮ | ⋮ |

ALARM SETTING

| ALARM TIME | xx:xx |

DAY OF WEEK ON OR OFF    SUN MON TUES WED THU FRI SAT
☐ ■ ■ ■ ■ ■ ☐

| ALARM MOVEMENT STRENGTH | STRONG |

| CRYING SOUND ON OR OFF | CRYING SOUND OFF |

| NUMBER OF SNOOZES | TWICE |

| CO-SLEEPING MODE LEVEL | LEVEL 2 |

| CO-SLEEPING START TIME | xx:xx |

STOP    TRANSMIT

DEVICE CONTROL APPARATUS, DEVICE CONTROL METHOD, AND RECORDING MEDIUM

CROSS REFERENCE TO RELATED APPLICATION

This application is based upon and claims the benefit of priority under 35 USC 119 of Japanese Patent Application No. 2021-042124 filed on Mar. 16, 2021, the entire disclosure of which, including the description, claims, drawings and abstract, is incorporated herein by reference in its entirety.

BACKGROUND

1. Technical Field

The present invention relates to a device control apparatus, a device control method, and a recording medium.

2. Related Art

Apparatuses have been developed to control movements of devices, such as robots, to be approximated to familiar beings such as friends and pets. For example, JP 2003-285286 A discloses a robot device capable of making a user feel simulated-growth by operating a scenario corresponding to a value of a growth parameter.

SUMMARY

An aspect of a device control apparatus according to the invention includes
- at least one processor configured to execute a program stored in at least one memory,
- in which the at least one processor
- determines whether a predetermined condition related to a simulated growth degree of a device is satisfied,
- acquires external stimulus data representing an external stimulus externally applied to the device,
- changes and sets basic character data according to a first condition based on the acquired external stimulus data in a case where the predetermined condition is not satisfied,
- corrects the changed and set basic character data according to a second condition, different from the first condition and based on the acquired external stimulus data, to obtain character data in a case where the predetermined condition is satisfied, and
- controls a movement of the device according to the changed and set basic character data in the case where the predetermined condition is not satisfied, and
- controls a movement of the device according to the character data obtained by the correction in the case where the predetermined condition is satisfied.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 11 is a view illustrating an exemplary character value radar chart according to the embodiment;

FIG. 12 is a view illustrating an exemplary growth table according to the embodiment;

FIG. 13 is a view illustrating an exemplary movement content table according to the embodiment;

FIG. 14 is a view illustrating an exemplary motion table according to the embodiment;

FIG. 18 is a view illustrating an exemplary alarm function setting screen according to the embodiment;

DETAILED DESCRIPTION

Figure 1:
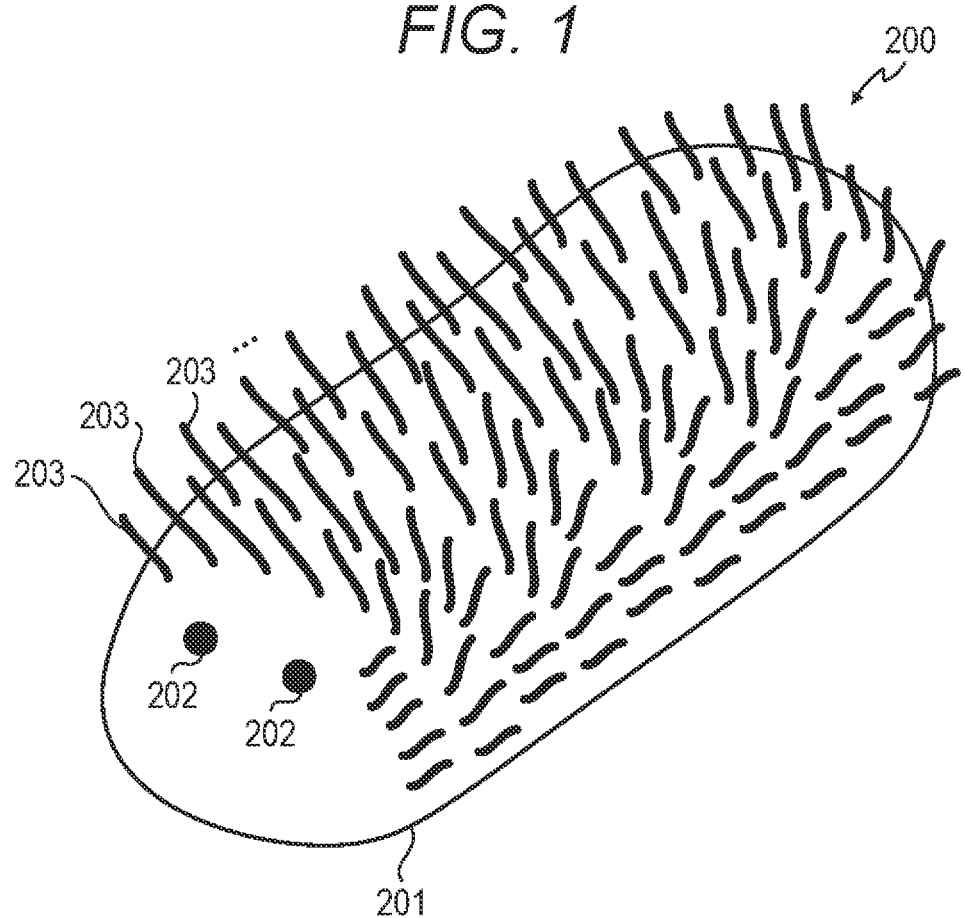
FIG. 1 is a view illustrating an appearance of a robot according to an embodiment.

Hereinafter, an embodiment of the invention will be described with reference to the drawings. In the drawings, the same or corresponding parts will be denoted by the same reference signs.

Embodiment

An embodiment in which a device control apparatus of the invention is applied to a robot 200 illustrated in FIG. 1 will be described with reference to the drawings. The robot 200 according to the embodiment is a pet robot that imitates a small animal and is driven by a rechargeable battery. As illustrated in FIG. 1, the robot 200 is covered with an outer cover 201 including decorative parts 202 in the similitude of eyes and abundant hairs 203. The outer cover 201 accommodates a housing 207 of the robot 200 As illustrated in FIG. 2, the housing 207 of the robot 200 includes a head 204, a joint 205, and a body 206, and the head 204 and the body 206 are coupled by the joint 205.

In the following description, it is assumed a case where the robot 200 is normally placed on a placement surface such as a floor, a direction of a part corresponding to a face of the robot 200 (the part of the head 204 opposite to the body 206) is defined as "front", and a direction of a part corresponding to buttocks (the part of the body 206 opposite to the head 204) is defined as "rear". Further, a direction of a part of the robot 200 in contact with the placement surface in the case of being normally placed on the placement surface is defined as "down", and its opposite direction is defined as "up". A direction orthogonal to a straight line extending in a front-rear direction of the robot 200 and also orthogonal to a straight line extending in an up-down direction is defined as a width direction.

Figure 2:
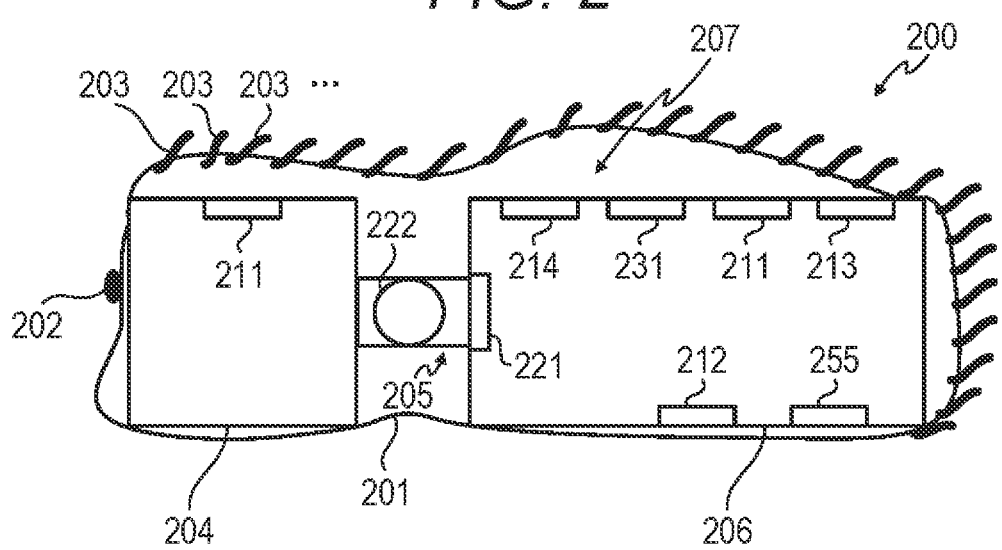
FIG. 2 is a cross-sectional view of the robot according to the embodiment as viewed from the side.

The body 206 extends in the front-rear direction as illustrated in FIG. 2. The body 206 comes into contact with the placement surface, such as the floor and a table, on which the robot 200 is placed via the outer cover 201. As illustrated in FIG. 2, a twist motor 221 is provided at a front end portion of the body 206, and the head 204 is coupled to the front end portion of the body 206 via the joint 205. The joint 205 is provided with an up-and-down motor 222. Note that the twist motor 221 is provided in the body 206 in FIG. 2, but may be provided in the joint 205 or in the head 204.

Figure 3:
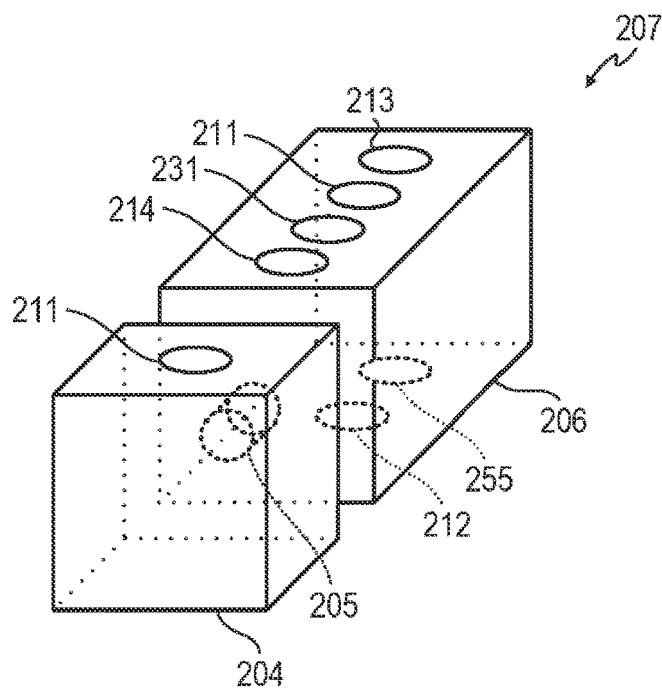
FIG. 3 is a view illustrating a housing of the robot according to the embodiment.
Figure 4:
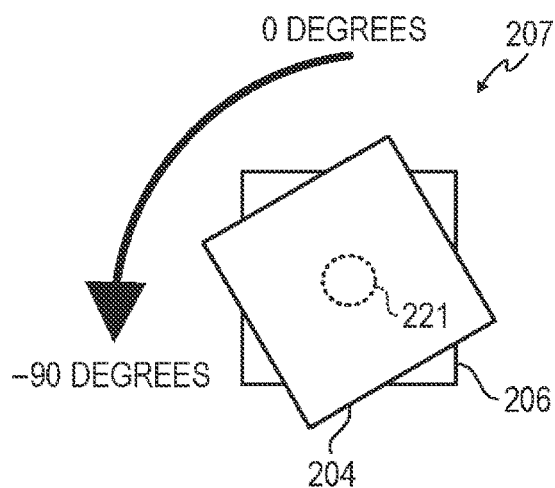
FIG. 4 is a view illustrating an exemplary movement of a twist motor of the robot according to the embodiment.
Figure 5:
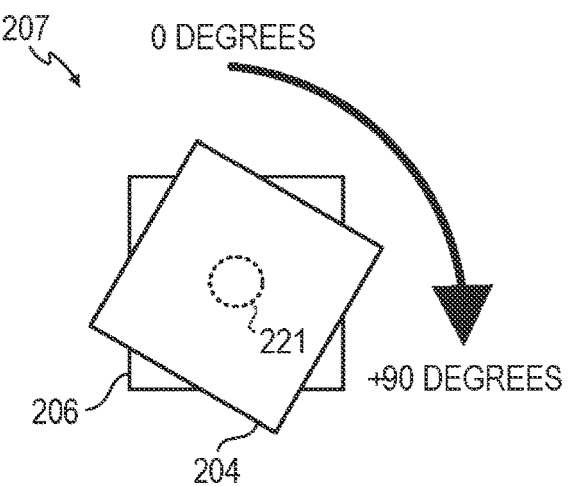
FIG. 5 is another view illustrating an exemplary movement of the twist motor of the robot according to the embodiment.

The joint 205 couples the body 206 and the head 204 so as to be rotatable about a first rotation axis extending in the front-rear direction of the body 206 through the joint 205 (by the twist motor 221). As illustrated in FIGS. 4 and 5 as front views of the housing 207, the twist motor 221 causes the head 204 to rotate (perform forward rotation) clockwise (right-handed turn) within a forward rotation angle range or rotate (perform reverse rotation) counterclockwise (left-handed turn) within a reverse rotation angle range with respect to the body 206 about the first rotation axis. The clockwise direction in this description is a clockwise direction at the time of viewing a direction from the body 206 to the head 204. Further, the clockwise rotation is also referred to as "twist rotation to the right", and the counterclockwise rotation is also referred to as "twist rotation to the left". A maximum value of an angle of the twist rotation to the right or left is arbitrary, but it is assumed that rotation can be performed up to 90 degrees to both the left and right in the embodiment. In FIGS. 4 and 5, an angle of the head 204 (hereinafter referred to as a "twist reference angle") in a state in which the head 204 is not twisted to the right or left as illustrated in FIG. 3 is 0 degree. The angle in a case of being twisted and rotated to the rightmost (rotated clockwise) is −90 degrees, and the angle in a case of being twisted to the leftmost (counterclockwise) is +90 degrees.

Figure 6:
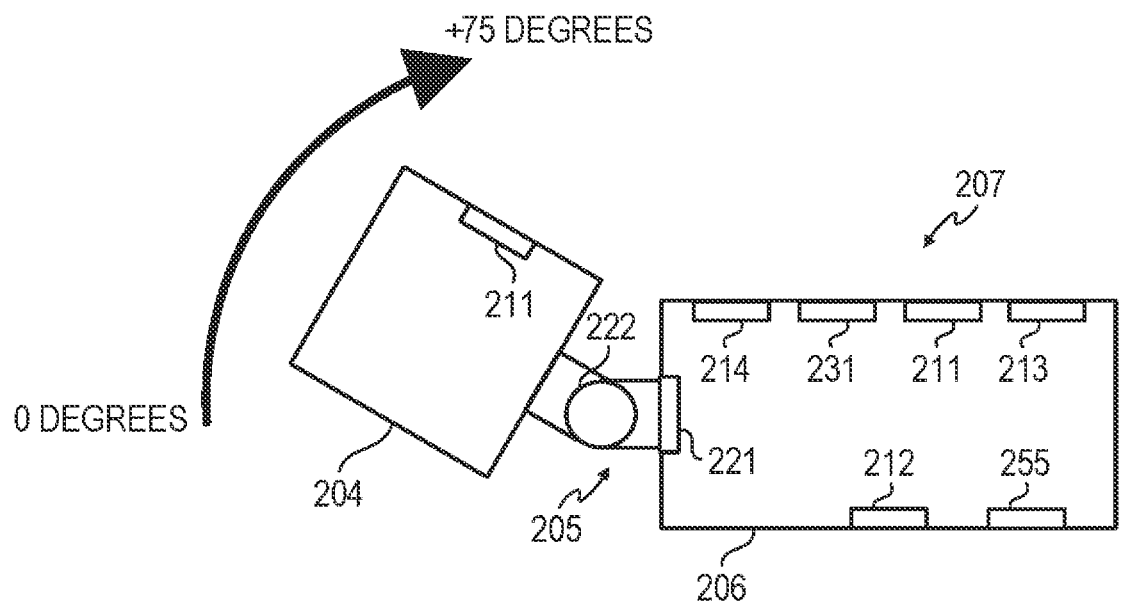
FIG. 6 is a view illustrating an exemplary movement of an up-and-down motor of the robot according to the embodiment.
Figure 7:
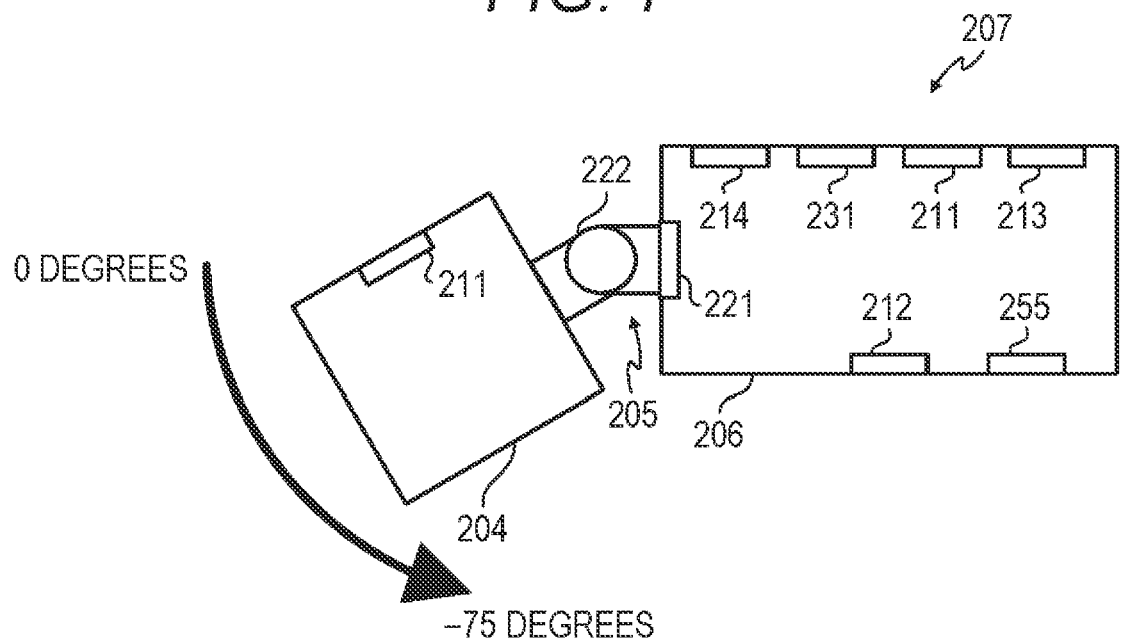
FIG. 7 is another view illustrating an exemplary movement of the up-and-down motor of the robot according to the embodiment.

The joint 205 couples the body 206 and the head 204 so as to be rotatable about a second rotation axis extending in the width direction of the body 206 through the joint 205 (by the up-and-down motor 222). As illustrated in FIGS. 6 and 7 as side views of the housing 207, the up-and-down motor 222 causes the head 204 to rotate (perform forward rotation) upward within a forward rotation angle range or rotate (perform reverse rotation) downward within a reverse rotation angle range about the second rotation axis. A maximum value of an angle of the upward or downward rotation is arbitrary, but it is assumed that rotation can be performed up to 75 degrees both upward and downward in the embodiment. In FIGS. 6 and 7, an angle of the head 204 (hereinafter referred to as an "up-and-down reference angle") in a state in which the head 204 is not rotated upward or downward as illustrated in FIG. 2 is 0 degrees, the angle in a case of being rotated most downward is −75 degrees, and the angle in a case of being rotated most upward is +75 degrees. In a case of being rotated at the up-and-down reference angle or downward more than the up-and-down reference angle by the upward and downward rotation about the second rotation axis, the head 204 can come into contact with the placement surface such as the floor and the table on which the robot 200 is placed via the outer cover 201. Although FIG. 2 illustrates the example in which the first rotation axis and the second rotation axis are orthogonal to each other, the first and second rotation axes are not necessarily orthogonal to each other.

As illustrated in FIG. 2, the robot 200 is provided with a touch sensor 211 on the head 204, and can detect that a user has stroked or hit the head 204. The body 206 is also provided with the touch sensor 211, and can detect that the user has stroked or hit the body 206.

The robot 200 is provided with an acceleration sensor 212 on the body 206, and can detect a posture of the robot 200 itself and detect that the robot 200 has been lifted, turned, or thrown by the user. Further, the robot 200 is provided with a microphone 213 on the body 206, and can detect an external sound. Further, the robot 200 is provided with a speaker 231 on the body 206, and can make a crying sound of the robot 200 or sing a song using the speaker 231.

Further, the robot 200 is provided with an illuminance sensor 214 on the body 206, and can detect the ambient brightness. Since the outer cover 201 is made of a material that transmits light to pass therethrough, the robot 200 can detect the ambient brightness with the illuminance sensor 214 even if being covered with the outer cover 201.

Further, the robot 200 is provided with a battery (see FIG. 9) as a power source for the twist motor 221 and the up-and-down motor 222, and a wireless power supply receiving circuit 255. The wireless power supply receiving circuit 255 is provided on the body 206, and receives electric power from a wireless charging device (not illustrated) provided separately from the robot 200 at the time of charging the battery.

In the embodiment, the acceleration sensor 212, the microphone 213, the illuminance sensor 214, and the speaker 231 are provided on the body 206, but all or some of them may be provided on the head 204. In addition to the acceleration sensor 212, the microphone 213, the illuminance sensor 214 and the speaker 231 provided on the body 206, all or some of them may be also provided on the head 204. Further, the touch sensors 211 are provided on the head 204 and the body 206, respectively, but may be provided on only one of the head 204 and the body 206. Further, any of them may be plural in number.

Since the housing 207 of the robot 200 is covered with the outer cover 201 in the embodiment, the head 204 and the body 206 come into indirect contact with the placement surface, such as the floor and the table, on which the robot 200 is placed via the outer cover 201. However, the embodiment is not limited to such a form, and the head 204 and the body 206 may come into direct contact with the placement surface. For example, a lower part (the part in contact with the placement surface) of the housing 207 may be exposed without a lower part (the part in contact with the placement surface) of the outer cover 201, or the entire housing 207 may be exposed without the outer cover 201.

Figure 8:
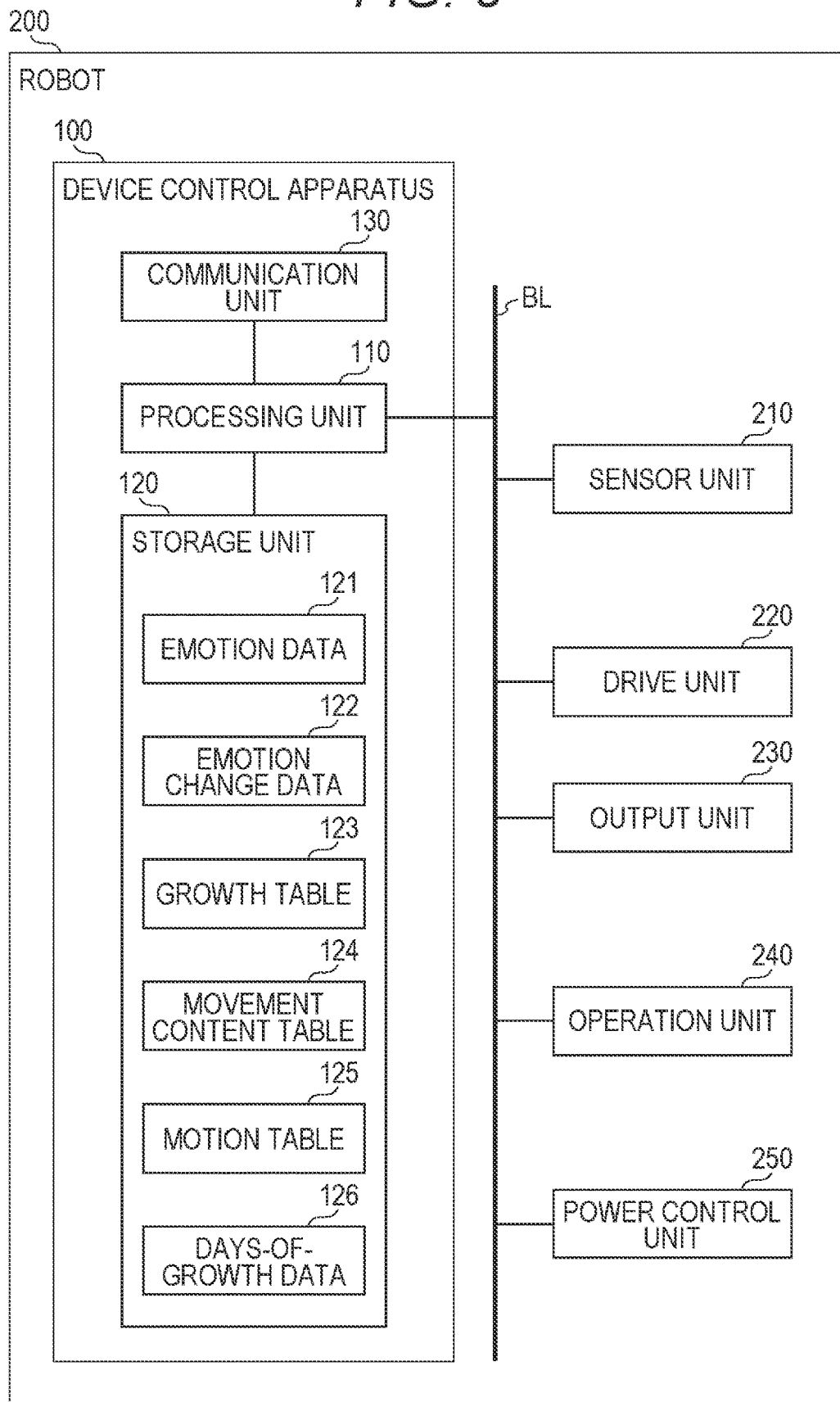
FIG. 8 is a block diagram illustrating a functional configuration of the robot according to the embodiment.

Next, a functional configuration of the robot 200 will be described. As illustrated in FIG. 8, the robot 200 includes a device control apparatus 100, a sensor unit 210, a drive unit 220, an output unit 230, an operation unit 240, and a power control unit 250. The device control apparatus 100 includes a processing unit 110 as at least one processor, a storage unit 120, and a communication unit 130. In FIG. 8, the device control apparatus 100 is connected with the sensor unit 210, the drive unit 220, the output unit 230, the operation unit 240, and the power control unit 250 via a bus line BL, but this is an example. The device control apparatus 100 may be connected with the sensor unit 210, the drive unit 220, the output unit 230, the operation unit 240, and the power control unit 250 via a wired interface such as a universal serial bus (USB) cable or a wireless interface such as Bluetooth (registered trademark). Further, the processing unit 110 may be connected with the storage unit 120 or the communication unit 130 via the bus line BL or the like.

The device control apparatus 100 controls a movement of the robot 200 by the processing unit 110 and the storage unit 120.

The processing unit 110 is configured using, for example, a central processing unit (CPU) or the like, and executes various processes to be described later by a program stored in the storage unit 120 as at least one memory. Since the processing unit 110 supports a multi-thread function that executes a plurality of processes in parallel, the various processes to be described later can be executed in parallel. The processing unit 110 also has a clock function and a timer function, and can keep the date and time or the like.

The storage unit 120 is configured using a read only memory (ROM), a flash memory, a random access memory (RAM), and the like. The ROM stores the program to be executed by the CPU of the processing unit 110 and data necessary for executing the program in advance. The flash memory is a rewritable non-volatile memory and stores data that is desirably saved even after the power is turned off. The RAM stores data that is created or changed during execution of the program.

The communication unit 130 includes a communication module compatible with a wireless local area network (LAN), Bluetooth (registered trademark), and the like, and performs data communication with an external device such as a smartphone. Examples of a content of the data communication include alarm setting data and sleep setting data to be used for setting an alarm function and a sleep function which will be described later.

The sensor unit 210 includes the touch sensor 211, the acceleration sensor 212, the microphone 213, and the illuminance sensor 214 described above. The processing unit 110 acquires detection values detected by various sensors included in the sensor unit 210 as external stimulus data representing external stimuli applied to the robot 200 via the bus line BL. The sensor unit 210 may include a sensor other than the touch sensor 211, the acceleration sensor 212, the microphone 213, and the illuminance sensor 214. In the case where types of sensors provided in the sensor unit 210 are increased, types of external stimuli that can be acquired by the processing unit 110 can be increased.

The touch sensor 211 detects contact of a certain object. The touch sensor 211 is configured using, for example, a pressure sensor or a capacitance sensor. The processing unit 110 can acquire a contact strength and a contact time based on detection values from the touch sensor 211, and detect the external stimuli such as the user's stroking or hitting with respect to the robot 200 based on these values (see, for example, JP 2019-217122 A). The processing unit 110 may detect these external stimuli with a sensor other than the touch sensor 211 (see, for example, Japanese Patent No. 6575637).

The acceleration sensor 212 detects the acceleration in the three-axial direction including the front-rear direction, the width (left-right) direction, and the up-down direction of the body 206 of the robot 200. Since the acceleration sensor 212 detects the gravitational acceleration in the case where the robot 200 is stationary, the processing unit 110 can detect a current posture of the robot 200 based on the gravitational acceleration detected by the acceleration sensor 212. For example, in a case where the user lifts or throws the robot 200, the acceleration sensor 212 detects the acceleration accompanying the movement of the robot 200 in addition to the gravitational acceleration. Therefore, the processing unit 110 can detect the movement of the robot 200 by removing a component of the gravitational acceleration from a detection value detected by the acceleration sensor 212.

The microphone 213 detects a sound around the robot 200. The processing unit 110 can detect, for example, that the user is calling the robot 200, clapping the hands, or the like, based on a component of the sound detected by the microphone 213.

The illuminance sensor 214 includes a light receiving element such as a photodiode, and detects the ambient brightness (illuminance). For example, in a case where the illuminance sensor 214 detects that the surrounding are dark, the processing unit 110 can perform control to put the robot 200 to sleep (into a sleep control mode) in a pseudo manner.

The drive unit 220 includes the twist motor 221 and the up-and-down motor 222 as movable units configured to express the movement of the robot 200 (own device). The drive unit 220 (the twist motor 221 and the up-and-down motor 222) is driven by the processing unit 110. The twist motor 221 and the up-and-down motor 222 are servomotors, and are operated to rotate up to a position of a specified movement angle by a specified movement time in a case where the processing unit 110 instructs the rotation with the specified movement time and movement angle. The drive unit 220 may be provided with another suitable actuator, for example, a fluid pressure motor or the like as a movable unit. As the processing unit 110 controls the drive unit 220, the robot 200 can express movements, for example, lifting the head 204 (rotating upward about the second rotation axis) and twisting sideways (rotating about the first rotation axis to twist to the right or left). Movement control data for execution of these movements is recorded in a motion table 125 to be described later, and the movement of the robot 200 is controlled based on the detected external stimulus, a growth value to be described later, and the like.

The output unit 230 includes the speaker 231. In a case where the processing unit 110 inputs sound data to the output unit 230, a sound is output from the speaker 231. For example, in a case where the processing unit 110 inputs crying sound data of the robot 200 to the output unit 230, the robot 200 outputs a simulated crying sound. This crying sound data is also recorded in the motion table 125, and a crying sound is selected based on the detected external stimulus, the growth value to be described later, and the like. The output unit 230 including the speaker 231 is also referred to as a sound output unit.

Instead of the speaker 231 or in addition to the speaker 231, a display such as a liquid crystal display and a light emitting unit such as a light emitting diode (LED) may be provided as the output unit 230, and an image based on the detected external stimulus, the growth value to be described later, and the like may be displayed on the display, or the LED may be made to emit light.

The operation unit 240 includes, for example, an operation button, a volume knob, and the like. The operation unit 240 is an interface configured to receive operations by a user (owner or lender), for example, power ON/OFF, volume adjustment of an output sound, and the like. Note that the robot 200 may include only a power switch 241 as the operation unit 240 on the inner side of the outer cover 201 and does not necessarily include the other operation buttons, the volume knob, and the like in order to further enhance a feeling like a living thing. Even in this case, it is possible to perform operations such as the volume adjustment of the robot 200 using an external smartphone or the like connected via the communication unit 130.

Figure 9:
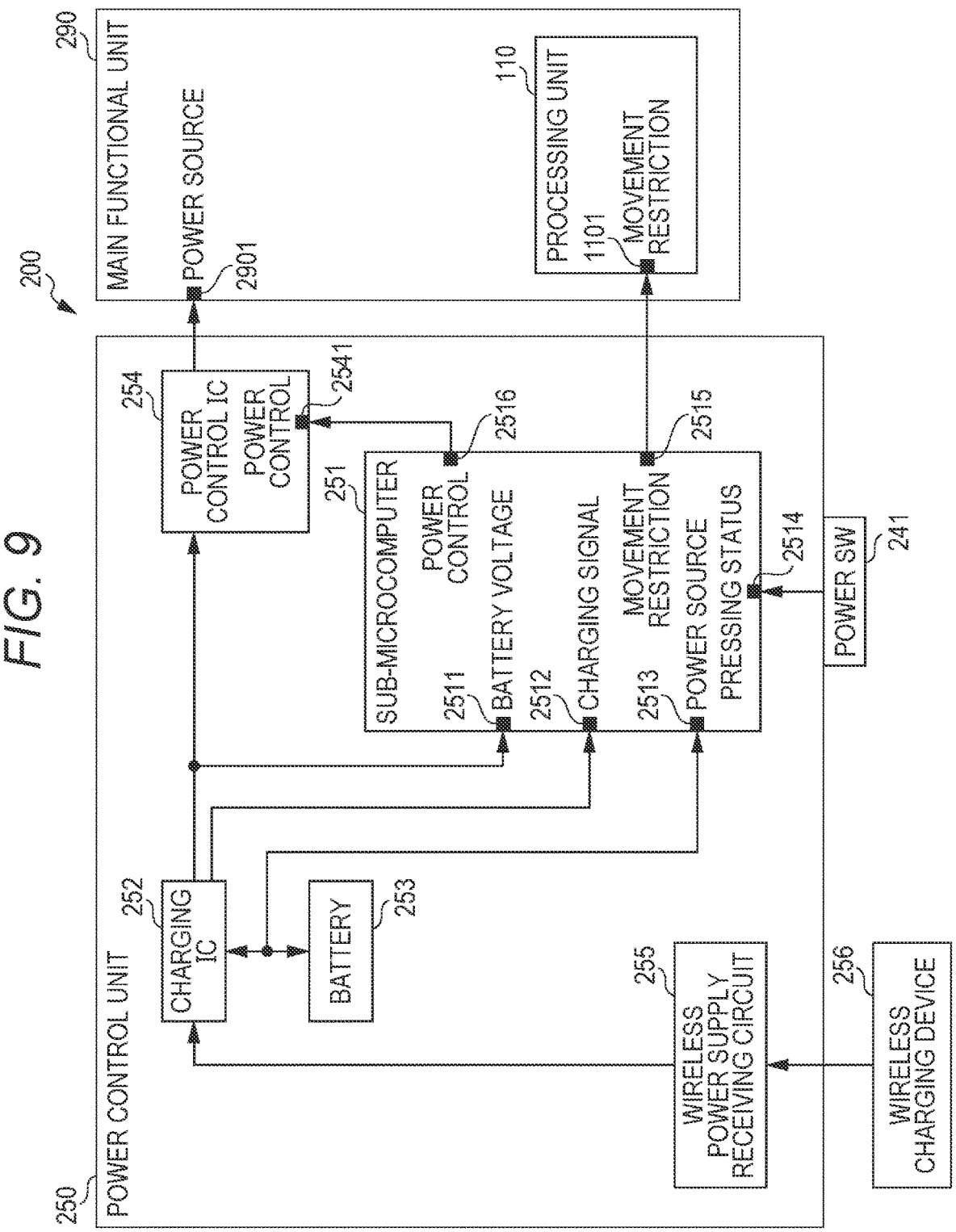
FIG. 9 is a block diagram illustrating a configuration of a power control unit according to the embodiment.

As illustrated in FIG. 9, the power control unit 250 includes a sub-microcomputer 251 and the like, and performs power control such as charging of the battery 253 of the robot 200 and ON/OFF control of the power of a main functional unit 290 that realizes the main functions of the robot 200. The main functional unit 290 corresponds to parts obtained by excluding the power control unit 250 from the functional units constituting the robot 200, and includes the processing unit 110, the drive unit 220, and the like. In the robot 200, the battery is charged by wireless charging without connection of a charging cable or the like in order to give the feeling like a living thing. Although the wireless charging may be performed using any scheme, an electromagnetic induction scheme is used in the embodiment.

In the case where the robot 200 is placed on a wireless charging device 256, an induced magnetic flux is generated between the wireless power supply receiving circuit 255 provided on a bottom surface of the body 206 and the external wireless charging device 256 so that charging is performed. In the electromagnetic induction scheme, it is difficult to perform normal charging if the robot 200 moves during charging to widen a distance between the wireless power supply receiving circuit 255 and the wireless charging device 256. Thus, a signal (movement restriction signal) that limits the movement of the robot 200 (drive unit 220) is transmitted from the sub-microcomputer 251 to the processing unit 110 during charging, and the processing unit 110 performs control so as to limit the movement of the robot 200. This mechanism will also be described later.

Returning to FIG. 8, among pieces of the data stored in the storage unit 120, emotion data 121, emotion change data 122, a growth table 123, a movement content table 124, the motion table 125, and days-of-growth data 126, which are pieces of characteristic data in the embodiment, will be described in order.

Figure 10:
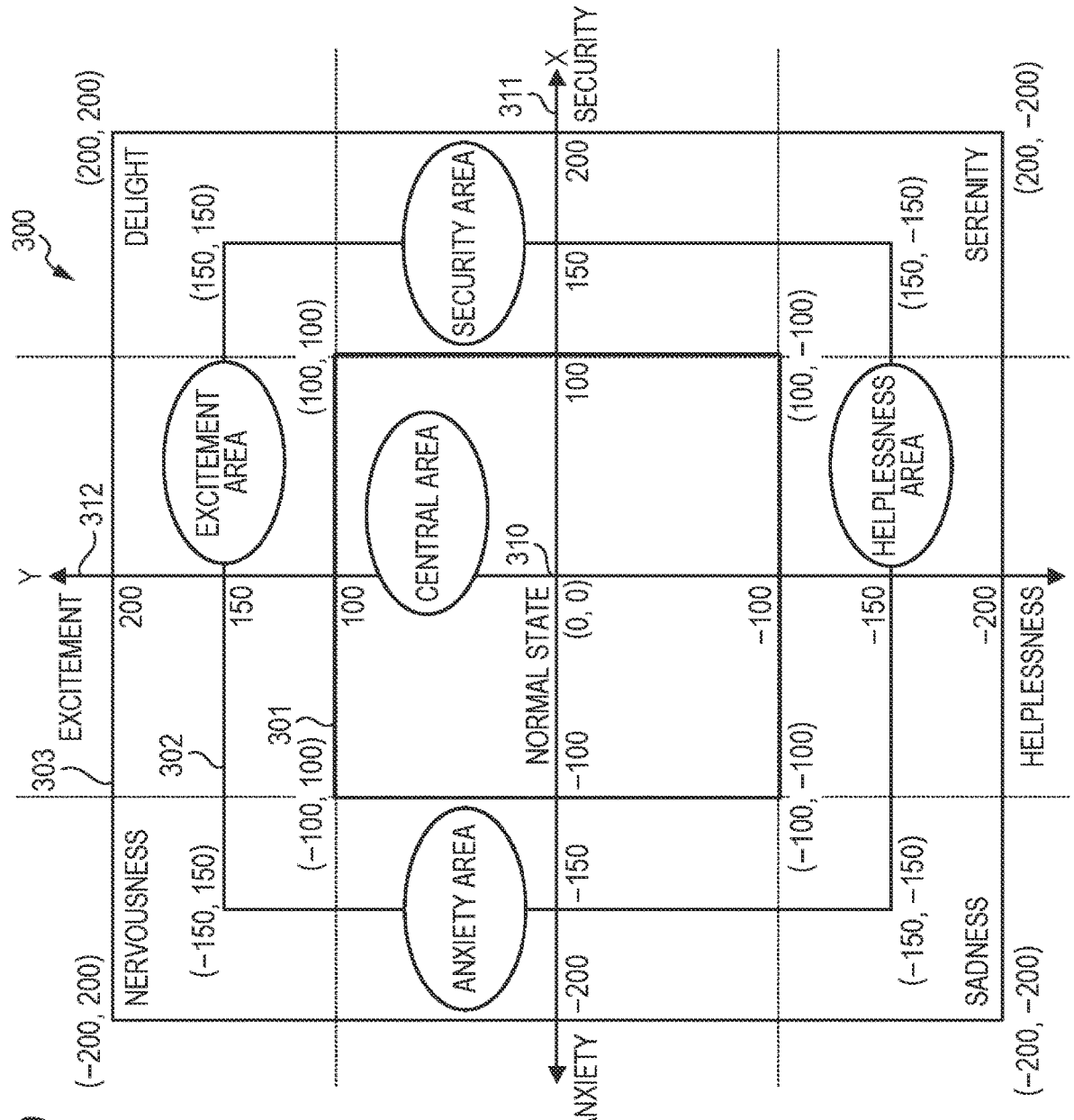
FIG. 10 is a view illustrating an exemplary emotion map according to the embodiment.

The emotion data 121 is data for giving the robot 200 a simulated emotion, and is data (X, Y) indicating coordinates on an emotion map 300. As illustrated in FIG. 10, the emotion map 300 is expressed by a two-dimensional coordinate system having an axis of a security degree (anxiety degree) as an X axis 311 and an axis of an excitement degree (helplessness degree) as a Y axis 312. An origin 310 (0, 0) on the emotion map represents an emotion in a normal state. The emotion is expressed such that a security degree increases as an absolute value of a positive X-coordinate value (X value) increases, and the excitement degree increases as an absolute value of a positive Y-coordinate value (Y value) increases. Further, the emotion is expressed such that the anxiety degree increases as an absolute value of a negative X value increases, and the helplessness degree increases as an absolute value of a negative Y value increases.

The emotion data 121 represents a plurality of simulated emotions (four in the embodiment) that are different from each other. In the embodiment, among values representing the simulated emotions, the security degree and the anxiety degree are collectively expressed on one axis (X axis), and the excitement degree and the helplessness degree are collectively expressed on another axis (Y axis). Therefore, the emotion data 121 has two values of the X value (the security degree or the anxiety degree) and the Y value (the excitement degree or the helplessness degree), and a point on the emotion map 300 expressed by the X value and the Y value represent the simulated emotion of the robot 200. An initial value of the emotion data 121 is (0, 0).

The emotion data 121 is data representing the simulated emotion of the robot 200. Although the emotion map 300 is expressed by the two-dimensional coordinate system in FIG. 10, the number of dimensions of the emotion map 300 is arbitrary. The emotion map 300 may be defined in one dimension, and one value may be set as the emotion data 121. Further, the emotion map 300 may be defined by a coordinate system having three or more dimensions by adding other axes, and values as many as the number of dimensions of the emotion map 300 may be set as the emotion data 121.

In the embodiment, a size of the emotion map 300 as an initial value is set to have a maximum value of 100 and a minimum value of −100 for both the X value and the Y value as illustrated in a frame 301 of FIG. 10. Then, during a first period, both the maximum value and the minimum value of the emotion map 300 are each expanded by 2 every time the days of simulated growth the robot 200 increase by one day. Here, the first period is a period in which the robot 200 grows in a pseudo manner, and is, for example, a period of 50 days from simulated birth of the robot 200. The simulated birth of the robot 200 is the first activation caused by the user after the robot 200 is shipped from a factory. In the case where the days of growth reach 25 days, the maximum value becomes 150 and the minimum value becomes −150 for both the X value and the Y value as illustrated in a frame 302 of FIG. 10. Then, in the case where the first period (50 days in this example) has elapsed, it is assumed that the simulated growth of the robot 200 has been completed, and the size of the emotion map 300 is fixed with the maximum value of 200 and the minimum value of −200 for both the X value and the Y value as illustrated in a frame 303 of FIG. 10.

A settable range of the emotion data 121 is defined by the emotion map 300. Thus, the settable range of the emotion data 121 expands as the size of the emotion map 300 expands. Such expansion of the settable range of the emotion data 121 enables expression of a greater variety of emotions, and thus, the simulated growth of the robot 200 is expressed by the expansion of the size of the emotion map 300. Then, the size of the emotion map 300 is fixed after the lapse of the first period, thereby ending the simulated growth of the robot 200. Note that a stop condition of the simulated growth of the robot 200 is not limited to the above-described "stop after the lapse of the first period", and other conditions may be added. For example, "stop in a case where any of four character values reaches 10 (maximum)" may be set. If the growth is stopped using this condition, the characters are fixed in a case where only one character among the four characters is maximized, and thus, it is be possible to strongly illustrate a specific character.

The emotion change data 122 is data for setting a change amount that increases or decreases each of the X value and the Y value of the emotion data 121. In the embodiment, the emotion change data 122 corresponding to the X value of the emotion data 121 includes DXP that increases the X value and DXM that decreases the X value, and the emotion change data 122 corresponding to the Y value of the emotion data 121 includes DYP that increases the Y value and DYM that decreases the Y value. That is, the emotion change data 122 is a data that includes the following four variables and indicates the degree of change of the simulated emotion of the robot 200.

DXP: Easiness of feeling secured (easiness of changing the X value in the positive direction on the emotion map)

DXM: Easiness of feeling anxious (easiness of changing the X value in the negative direction on the emotion map)

DYP: Easiness of feeling excited (easiness of changing the Y value in the positive direction on the emotion map)

DYM: Easiness of feeling helpless (easiness of changing the Y value in the negative direction on the emotion map)

In the embodiment, as an example, initial values of all of these variables are set to 10, and the values are increased up to 20 by a process of learning the emotion change data in a movement control process to be described later. In this learning process, the emotion change data is changed according to a condition (a first condition based on the external stimulus data) based on whether a value of emotion data reaches the maximum value or the minimum value of the emotion map 300. Note that the first condition based on the external stimulus data is not limited to the above condition, but any condition can be set as long as being a condition for changing (learning) emotion change data before the size of the emotion map 300 is fixed (for example, condition related to the degree of the simulated emotion of the robot 200 represented by the emotion data 121). Since this learning process changes the emotion change data 122, that is, the degree of the emotion change, the robot 200 illustrates various characters depending on how the user interacts with the robot 200. That is, the character of the robot 200 is formed differently depending on the way of interaction with the user.

Therefore, each piece of character data (character value) is derived by subtracting 10 from each piece of the emotion change data 122 in the embodiment. That is, a value obtained by subtracting 10 from DXP indicating the easiness of feeling secured is used as a character value (happy), a value obtained by subtracting 10 from DXM indicating the easiness of feeling anxious is used as a character value (shy), a value obtained by subtracting 10 from DYP indicating the easiness of feeling excited is used as a character value (active), and a value obtained by subtracting 10 from DYM indicating the easiness of feeling helpless is used as a character value (wanted). As a result, for example, as illustrated in FIG. 11, a character value radar chart 400 can be generated by plotting the character value (happy) on an axis 411, the character value (active) on an axis 412, the character value (shy) on an axis 413, and the character value (wanted) on an axis 414.

Since an initial value of each character value is 0, the first character of the robot 200 is represented by an origin 410 of the character value radar chart 400. Then, as the robot 200 grows, each character value changes up to 10, which is an upper limit, due to an external stimulus or the like (how the user interacts with the robot 200) detected by the sensor unit 210. In a case where the four character values change from 0 to 10 as in the embodiment, it is possible to express characters corresponding to a fourth power of $11=14641$ types.

In the embodiment, the largest value among these four character values is used as the growth degree data (growth value) indicating the simulated growth degree of the robot 200. Then, the processing unit 110 performs control such that a movement content of the robot 200 varies with the simulated growth of the robot 200 (as the growth value increases). The data used by the processing unit 110 for this purpose is the growth table 123.

As illustrated in FIG. 12, types of movements performed by the robot 200 according to movement triggers, such as external stimuli detected by the sensor unit 210, and a probability that each of the movements is selected according to a growth value (hereinafter referred to as a "movement selection probability") are recorded in the growth table 123. The movement selection probabilities are set such that basic movements set according to the movement triggers are selected regardless of the character values while the growth value is small, and character movements set according to the character values are selected in the case where the growth value increases. Further, the movement selection probabilities are set such that types of the basic movements that can be selected increase as the growth value increases. Although one character movement is selected for each movement trigger in FIG. 12, types of the character movements to be selected can be increased as the character value increases similarly to the basic movement.

For example, as illustrated in FIG. 11, it is assumed a case where the character value (happy) is 3, the character value (active) is 8, the character value (shy) is 5, and the character value (wanted) is 4 as the current character values of the robot 200 and the microphone 213 has detected a loud sound. In this case, a growth value is 8, which is the maximum value among the four character values, and the movement trigger is "hearing a loud sound". Then, in the growth table 123 illustrated in FIG. 12, in the case of referring to an item with the movement trigger "hearing a loud sound" and the growth value of 8, it can be seen that the movement selection probabilities are set to be 20% for a "basic movement 2-0", 20% for a "basic movement 2-1", 40% for a "basic movement 2-2", and 20% for a "character movement 2-0".

In other words, in this case, the "basic movement 2-0" is selected at the probability of 20%, the "basic movement 2-1" is selected at the probability of 20%, the "basic movement 2-2" is selected at the probability of 40%, and the "character movement 2-0" is selected at the probability of 20%. In a case where the "character movement 2-0" is selected, any of the four types of character movements as illustrated in FIG. 13 is further selected according to the four character values. Then, the robot 200 executes the movement selected here. This mechanism is implemented by the movement control process to be described later. Note that a movement mode for selecting a movement from among the character movements is called a first movement mode, and a movement mode for selecting a movement from among the basic movements is called a second movement mode.

As will be described later, the character movement is selected with a probability according to the magnitude of each of the four character values, and thus. there are few variations in selection while the character values are small (for example, most of them are zero). Therefore, the maximum value among the four character values is set as the growth value in the embodiment. As a result, there is an effect that the first movement mode is selected in a case where there are many variations of movements to be selected as the character movement. Note that not only the maximum value but also a total value, an average value, a mode value, and the like can be used as an index for the determination on whether there are many variations of movements to be selected based on the character values, and thus, the total value, the average value, the mode value, and the like of the character values may be used as the growth value.

Note that the growth table 123 may have any form as long as the growth table 123 can be defined as a function (growth function) that returns the movement selection probability of each movement type using the growth value as an argument for each movement trigger, and is not necessarily data in the table format as illustrated in FIG. 12.

As illustrated in FIG. 13, the movement content table 124 is a table in which a specific movement content of each movement type defined in the growth table 123 is recorded. Meanwhile, a movement content is defined for each type of character regarding the character movements. Note that the movement content table 124 is not essential data. For example, the movement content table 124 is unnecessary if the growth table 123 is configured in a form of directly recording a specific movement content in an item of the movement type of the growth table 123.

As illustrated in FIG. 14, the motion table 125 is a table in which how the processing unit 110 controls the twist motor 221 and the up-and-down motor 222 is recorded for each movement type defined by the growth table 123. Specifically, as illustrated in FIG. 14, a movement time (milliseconds), a movement angle of the twist motor 221 after the movement time, and a movement angle of the up-and-down motors 222 after the movement time are recorded in rows, respectively, for each movement type. Note that sound data output from the speaker 231 for each movement type is also recorded in the embodiment.

For example, in a case where the basic movement 2-0 is selected by the movement control process to be described later, the processing unit 110 first controls both the twist motor 221 and the up-and-down motor 222 to have the angle of 0 degrees after a lapse of 100 milliseconds, and then, controls the up-and-down motor 222 to have the angle of −24 degrees after a lapse of another 100 milliseconds. Thereafter, the rotation is not performed for 700 milliseconds, and then, control is performed such that the angle of the twist motor 221 becomes 34 degrees and the angle of the up-and-down motor 222 becomes −24 degrees 500 milliseconds later. Then, the twist motor 221 is controlled to have the angle of −34 degrees 400 milliseconds later, and then, both the twist motor 221 and the up-and-down motor 222 are controlled to have the angle of 0 degrees 500 milliseconds later, thereby completing the operation of the basic movement 2-0. In parallel with the above-described driving of the twist motor 221 and the up-and-down motor 222, the processing unit 110 reproduces a bleep sound from the speaker 231 based on sound data of the bleep sound.

The days-of-growth data 126 has an initial value of 1, and is added by one every lapse of one day. The days-of-growth data 126 represents days of simulated growth (the number of days since the simulated birth) of the robot 200. Here, a period of the days of growth represented by the days-of-growth data 126 is referred to as a second period.

Although not illustrated, the storage unit 120 also stores four character correction values (happy correction value, active correction value, shy correction value, and wanted correction value) which are increased or decreased in a character correction value adjustment process to be described later. Although the respective character values (character value (happy), character value (active), character value (shy), and character value (wanted)) are fixed in the case where the simulated growth of the robot 200 is completed, the character correction value is data (character correction data) for correcting the character according to how the user interacts with the robot 200 even after the completion of the growth. As will be described later, the character correction value is set on the emotion map 300 according to a condition (second condition based on the external stimulus data) based on any location of an area where the emotion data 121 has been present for the longest time. Note that the second condition based on the external stimulus data is not limited to the above condition, but any condition can be set as long as being a condition for correcting the character after the size of the emotion map 300 is fixed (for example, condition related to the occurrence frequency of the simulated emotion of the robot 200 represented by the emotion data 121).

Next, the movement control process executed by the processing unit 110 of the device control apparatus 100 will be described with reference to a flowchart illustrated in FIG. 15. The movement control process is a process in which the device control apparatus 100 controls a movement and a crying sound of the robot 200 based on a detection value from the sensor unit 210 and the like. In a case where the user turns on the power of the robot 200, execution of a thread of this movement control process is started in parallel with an alarm control process, a sleep control process, and the like which will be described later. The drive unit 220 and the output unit 230 (sound output unit) are controlled by the movement control process to express the movement of the robot 200 or outputting a sound such as a crying sound.

First, the processing unit 110 sets various types of data such as the emotion data 121, the emotion change data 122, the days-of-growth data 126, and the character correction values (step S101). In the case where the robot 200 is activated for the first time (the first activation by the user after shipment from the factory), these values are set to initial values (the initial values of the emotion data 121, the emotion change data 122, the days-of-growth data 126, and the character correction values are all zero), but values of pieces of data stored in step S109, which will be described later, in a previous robot control process, are set at the second and subsequent activation. However, all of the emotion data 121 and the character correction values may be initialized to zero every time the power is turned on.

Next, the processing unit 110 determines whether there is an external stimulus detected by the sensor unit 210 (step S102). If there is an external stimulus (step S102; Yes), the processing unit 110 acquires the external stimulus from the sensor unit 210 (step S103).

Then, the processing unit 110 acquires the emotion change data 122 to be added to or subtracted from the emotion data 121 in response to the external stimulus acquired in step S103 (step S104). Specifically, for example, in a case where the touch sensor 211 of the head 204 detects that the head 204 has been stroked as the external stimulus, the robot 200 obtains a simulated sense of security, so that the processing unit 110 acquires DXP as the emotion change data 122 to be added to the X value of the emotion data 121.

Then, the processing unit 110 sets the emotion data 121 according to the emotion change data 122 acquired in step S104 (step S105). Specifically, for example, if DXP is acquired as the emotion change data 122 in step S104, the processing unit 110 adds DXP of the emotion change data 122 to the X value of the emotion data 121. However, in a case where the value (the X value or the Y value) of the emotion data 121 exceeds the maximum value of the emotion map 300 if being added by the emotion change data 122, the value of the emotion data 121 is set to the maximum value of the emotion map 300. In a case where the value of the emotion data 121 is less than the minimum value of the emotion map 300 if being subtracted by the emotion change data 122, the value of the emotion data 121 is set to the minimum value of the emotion map 300.

Which piece of the emotion change data 122 is acquired to set the emotion data 121 can be arbitrarily set for each external stimulus in step S104 and step S105, but an example is given as follows. Since the maximum values and the minimum values of the X value and the Y value of the emotion data 121 are defined by the size of the emotion map 300, the maximum value is set in a case where a result of the following calculation exceeds the maximum value of the emotion map 300, and the minimum value is set in a case where the result is below the minimum value of the emotion map 300.

The head 204 is stroked (feeling secured): X=X+DXP
The head 204 is hit (feeling anxious): X=X−DXM
(These external stimuli can be detected by the touch sensor 211 on the head 204)
The body 206 is stroked (feeling excited): Y=Y+DYP
The body 206 is hit (become helpless): Y=Y−DYM
(These external stimuli can be detected by the touch sensor 211 on the body 206)
Being embraced with the head up (feeling delighted): X=X+DXP and Y=Y+DYP
Being suspended with the head down (feeling sad): X=X−DXM and Y=Y−DYM
(These external stimuli can be detected by the touch sensor 211 and the acceleration sensor 212)
Being called with a gentle sound (feeling serene): X=X+DXP and Y=Y−DYM
Being yelled with a loud sound (feeling nervous): X=X−DXM and Y=Y+DYP
(These External Stimuli can be Detected by the Microphone 213)

For example, in a case where the head 204 is stroked, the simulated emotion of the robot 200 is "feeling secured", and thus, DXP of the emotion change data 122 is added to the X value of the emotion data 121. On the contrary, in a case where the head 204 is hit, the simulated emotion of the robot 200 is "feeling anxious", so that DXM of the emotion change data 122 is subtracted from the X value of the emotion data 121. In step S103, the processing unit 110 acquires a plurality of external stimuli of types different from each other by the plurality of sensors included in the sensor unit 210. Thus, the emotion change data 122 is acquired according to each of the plurality of external stimuli, and the emotion data 121 is set according to the acquired emotion change data 122.

Then, the processing unit 110 executes the movement selection process using information on the external stimulus acquired in step S103 as the movement trigger (step S106), and then, proceeds to step S108. Note that details of the movement selection process will be described later, but the movement trigger is information such as an external stimulus serving as a trigger for a certain movement of the robot 200.

On the other hand, if there is no external stimulus in step S102 (step S102; No), the processing unit 110 determines whether to perform a spontaneous movement such as a breathing movement (step S107). Although a method of determining whether to perform the spontaneous movement is arbitrary, it is assumed that the determination in step S107 is "Yes" every first reference time (for example, 5 seconds) in the embodiment.

If the spontaneous movement is performed (step S107; Yes), the processing unit 110 proceeds to step S106 and executes the movement selection process with a "lapse of the first reference time" as the movement trigger, and then, proceeds to step S108.

If the spontaneous movement is not performed (step S107; No), the processing unit 110 determines whether to end the process (step S108). For example, in a case where the operation unit 240 receives an instruction from the user to turn off the power of the robot 200, it is determined to end the process. If it is determined to end the process (step S108; Yes), the processing unit 110 stores various types of data, such as the emotion data 121, the emotion change data 122, and the days-of-growth data 126, in the non-volatile memory (for example, flash memory) of the storage unit 120 (step S109), and ends the movement control process. Note that, a power OFF determination thread may be separately operated in parallel with other threads, such as the movement control process, regarding the process of storing the various types of data in the non-volatile memory in the case where the power is turned off. If the processing corresponding to step S108 and step S109 is performed by the power OFF determination thread, the processing in step S108 and step S109 of the movement control process can be omitted.

If it is determined not to end the process (step S108; No), the processing unit 110 determines whether the date has changed using the clock function (step S110). If the date has not changed (step S110; No), the processing unit 110 returns to step S102.

If the date has changed (step S110; Yes), the processing unit 110 determines whether it is in the first period (step S111). Assuming that the first period is, for example, a period of 50 days since the simulated birth of the robot 200 (for example, at the time of the first activation by the user after purchase), the processing unit 110 determines that it is in the first period if the days-of-growth data 126 is 50 or less. If it is not in the first period (step S111; No), the processing unit 110 executes the character correction value adjustment process (step S112), and proceeds to step S115. Note that details of the character correction value adjustment process will be described later.

If it is in the first period (step S111; Yes), the processing unit 110 performs learning of the emotion change data 122 (step S113). Specifically, the emotion change data 122 is updated by adding one to DXP of the emotion change data 122 if the X value of the emotion data 121 is set to the maximum value of the emotion map 300 even once in step S105 on that day, adding one to DYP of the emotion change data 122 if the Y value of the emotion data 121 is set to the maximum value of the emotion map 300 even once in step S105 on that day, adding one to DXM of the emotion change data 122 if the X value of the emotion data 121 is set to the minimum value of the emotion map 300 even once in step S105 on that day, and adding one to DYM of the emotion change data 122 if the Y value of the emotion data 121 is set to the minimum value of the emotion map 300 even once in step S105 on that day. This update is also referred to as the learning of the emotion change data 122.

However, if each value of the emotion change data 122 becomes too large, the amount of one-time change of the emotion data 121 becomes too large. Thus, each value of the emotion change data 122 has the maximum value of 20, for example, and is limited to be equal to or less than that the maximum value. Here, one is added to any piece of the emotion change data 122, but the value to be added is not limited to one. For example, the number of times each value of the emotion data 121 has been set to the maximum value or the minimum value of the emotion map 300 may be counted, and a numerical value to be added to the emotion change data 122 may be increased if the number of times is large.

The learning of the emotion change data 122 in step S113 is based on whether the emotion data 121 is set to the maximum value or the minimum value of the emotion map 300 in step S105. Whether the emotion data 121 is set to the maximum value or the minimum value of the emotion map 300 in step S105 is based on the external stimulus acquired in step S103. Since the plurality of external stimuli of types different from each other are acquired by the plurality of sensors provided in the sensor unit 210 in step S103, each piece of the emotion change data 122 is learned according to each of the plurality of external stimuli.

For example, if only the head 204 is stroked many times, only DXP of the emotion change data 122 increases, and the other emotion change data 122 does not change, so that the robot 200 has a character that easily feels secured. If only the head 204 is hit many times, only DXM of the emotion change data 122 increases, and the other emotion change data 122 does not change, so that the robot 200 has a character that easily feels anxious. In this manner, the processing unit 110 learns to make pieces of the emotion change data 122 different from each other according to each of the external stimuli. In the embodiment, the character value is calculated from the emotion change data 122, and the maximum value of the character value is set as the growth value. Thus, it is possible to obtain an effect of the simulated growth of the robot 200 based on how the user interacts with the robot 200.

In the embodiment, if the X value or the Y value of the emotion data 121 reaches the maximum value or the minimum value of the emotion map 300 even once in step S105 within a period of one day, the emotion change data 122 is learned. However, a condition for learning the emotion change data 122 is not limited thereto. For example, the emotion change data 122 may be learned if the X value or the Y value of the emotion data 121 reaches the predetermined value even once (for example, a value of 0.5 times the maximum value or a value of 0.5 times the minimum value of the emotion map 300). Further, the period is not limited to the period of one day, either, and the emotion change data 122 may be learned if the X value or the Y value of the emotion data 121 reaches a predetermined value even once within another period such as half a day and one week. Further, the emotion change data 122 may be learned if the X value or the Y value of the emotion data 121 reaches a predetermined value even once within a period until the number of acquisitions of external stimuli reaches a predetermined number of times (for example, 50 times), instead of a fixed period such as one day.

Returning to FIG. 15, the processing unit 110 expands the emotion map 300 by 2 for both the maximum value and the minimum value (step S114). Although the emotion map 300 is expanded by 2 for both the maximum and minimum values here, this numerical value "2" for expansion is merely an example, and expansion may be performed by 3 or more, or expansion may be performed only by 1. Further, numerical values for expansion are not necessarily the same for each of the axes of the emotion map 300 and for the maximum value and the minimum value. Then, the processing unit 110 adds one to the days-of-growth data 126, initializes the emotion data to zero for both the X value and the Y value (step S115), and returns to step S102.

Figure 15:
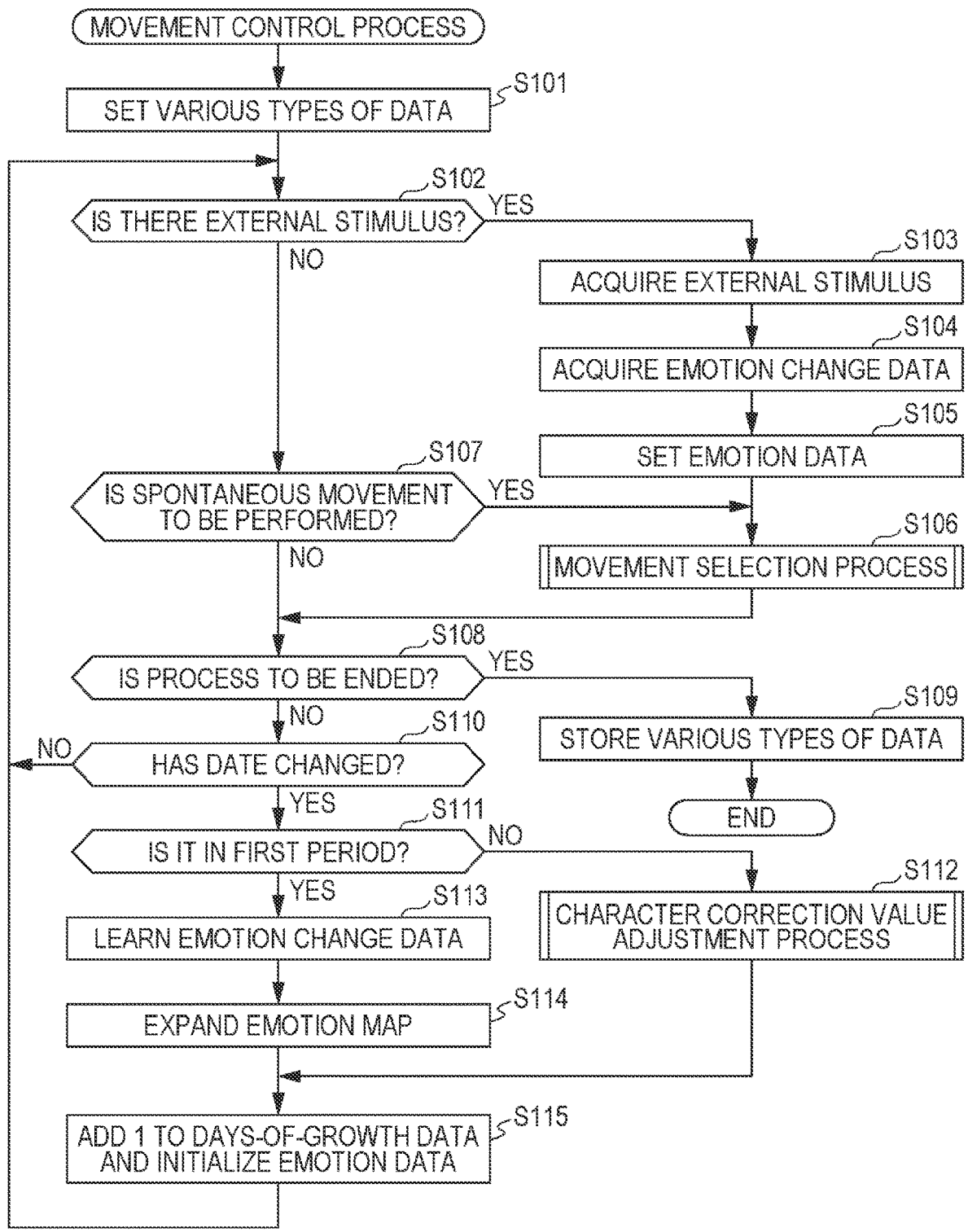
FIG. 15 is a flowchart of a movement control process according to the embodiment.

The learning of the emotion change data and the expansion of the emotion map are performed after it is determined in step S110 that the date has changed in FIG. 15, but may be performed after it is determined that the reference time (for example, 9:00 pm) has come. Further, the determination in step S110 may be determined based on a value obtained by accumulating the time for which the power of the robot 200 is turned on using the timer function of the processing unit 110, instead of the determination based on the actual date. For example, every time the cumulative power-on time becomes a multiple of 24, the robot 200 may be regarded as having grown for one day, and the learning of the emotion change data and the expansion of the emotion map may be performed. The determination may be performed based on the number of acquisitions of external stimuli (for example, it is regarded as growth for one day whenever the number of acquisitions becomes 100 times) in consideration of a user who tends to neglect the robot 200 (such that the robot 200 slowly grows if being neglected).

Next, the movement selection process executed in step S106 of the above-described movement control process will be described with reference to FIG. 16.

First, the processing unit 110 determines whether it is in the first period (step S200). in the first period (step S200; Yes), the processing unit 110 calculates the character value from the emotion change data 122 learned in step S113 (step S201). Specifically, the four character values are calculated as follows. Since the initial value of each piece of the emotion change data 122 is 10 and is increased up to the maximum of 20, a value range is set to 0 or more and 10 or less by subtracting 10.

Character value (happy)=DXP−10
Character value (shy)=DXM−10
Character value (active)=DYP−10
Character value (wanted)=DYM−10

On the other hand, if it is not in the first period (step S200; No), the processing unit 110 calculates the corrected character value based on the emotion change data 122 learned in step S113 and the character correction value adjusted in step S112 (step S209). Specifically, the four character values are calculated as follows. Since the initial value of each piece of the emotion change data 122 is 10 and is increased up to the maximum of 20, a range of values is set to 0 or more and 10 or less by subtracting 10, and then, adding each correction value. However, a value obtained by adding the correction value is corrected to 0 if being negative, and is corrected to 10 if exceeding 10 such that the respective character values are 0 or more and 10 or less.

Character value (happy)=DXP−10+happy correction value
Character value (shy)=DXM−10+shy correction value
Character value (active)=DYP−10+active correction value
Character value (wanted)=DYM−10+wanted correction value Next, the processing unit 110 calculates the largest numerical value among these character values as the growth value (step S202). Then, the processing unit 110 refers to the growth table 123, and acquires the movement selection probability of each of the movement types corresponding to the movement trigger given at the time of executing the movement selection process and the growth value calculated in step S202 (step S203).

Next, the processing unit 110 selects the movement type using a random number based on the movement selection probability of each of the movement types acquired in step S203 (step S204). For example, in a case where the calculated growth value is 8 and the movement trigger is "hearing a loud sound", the "basic movement 2-0" is selected at the probability of 20%, the "basic movement 2-1" is selected at the probability of 20%, the "basic movement 2-2" is selected at the probability of 40%, and the "character movement 2-0" is selected at the probability of 20% (see FIG. 12).

Then, the processing unit 110 determines whether the character movement has been selected in step S204 (step S205). If the character movement has not been selected, that is, the basic movement has been selected (step S205; No), the process proceeds to step S208.

If the character movement has been selected (step S205; Yes), the processing unit 110 acquires a selection probability of each character based on the magnitude of each of the character values (step S206). Specifically, for each character, a value obtained by dividing the character value corresponding to the character by a total value of the four character values is defined as the selection probability of the character.

Then, the processing unit 110 selects the character movement using a random number based on the selection probability of each of the characters acquired in step S206 (step S207). For example, in a case where the character value (happy) is 3, the character value (active) is 8, the character value (shy) is 5, and the character value (wanted) is 4, the total value of them is 3+8+5+4=20. Therefore, in this case, the character movement of "happy" is selected at the probability of 3/20=15%, the character movement of "active" is selected at the probability of 8/20=40%, the character movement of "shy" is selected at the probability of 5/20=25%, and the character movement of "wanted" is selected at the probability of 4/20=20%.

Next, the processing unit 110 executes the movement selected in step S204 or S207 (step S208), ends the movement selection process, and proceeds to step S108 in the movement control process.

Figure 17:
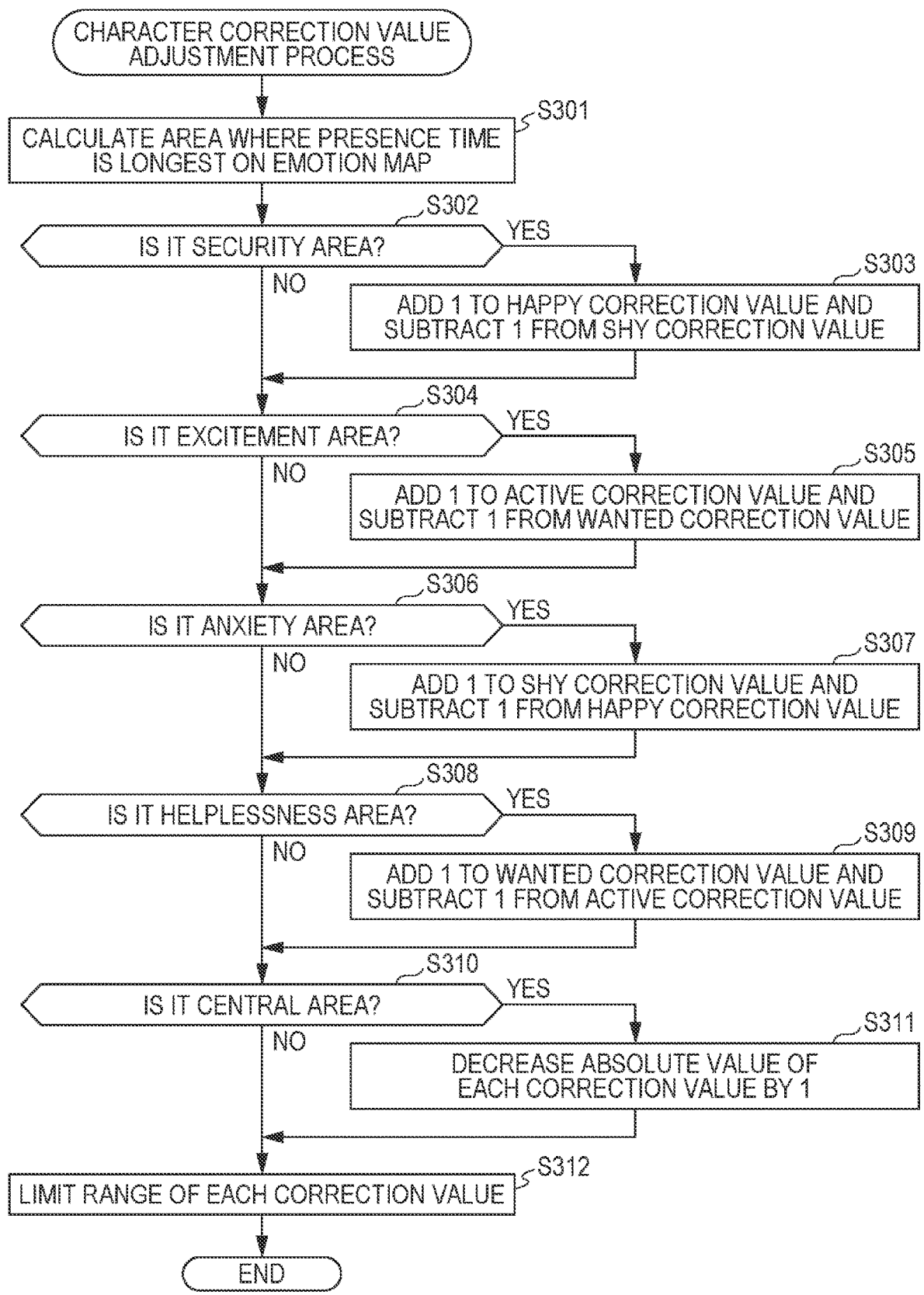
FIG. 17 is a flowchart of a character correction value adjustment process according to the embodiment.

Next, the character correction value adjustment process executed in step S112 of the above-described movement control process will be described with reference to FIG. 17.

First, the processing unit 110 calculates an area where the emotion data 121 has been present for the longest time (hereinafter referred to as a "longest presence area") during the day (while the determination in step S110 in FIG. 15 is switched from No to Yes) on the emotion map 300 based on a history of change in the emotion data 121 (movement on the emotion map 300) during the day (step S301).

Then, the processing unit 110 determines whether the longest presence area calculated in step S301 is a security area (specifically, the area whose X value is 100 or more) on the emotion map 300 illustrated in FIG. 10 (step S302). If the longest presence area is the security area on the emotion map 300 (step S302; Yes), the processing unit 110 adds 1 to the happy correction value among the character correction values and subtracts 1 from the shy correction value (step S303), and proceeds to step S304.

If the longest presence area is not the security area on the emotion map 300 (step S302; No), the processing unit 110 determines whether the longest presence area is an excitement area on the emotion map 300 (specifically, the area whose Y value is 100 or more) (step S304). If the longest presence area is the excitement area on the emotion map 300 (step S304; Yes), the processing unit 110 adds 1 to the active correction value among the character correction values and subtracts 1 from the wanted correction value (step S305), and proceeds to step S306.

If the longest presence area is not the excitement area on the emotion map 300 (step S304; No), the processing unit 110 determined whether the longest presence area is an anxiety area on the emotion map 300 (specifically, the area whose X value is −100 or less) (step S306). If the longest presence area is the anxiety area on the emotion map 300 (step S306; Yes), the processing unit 110 adds 1 to the shy correction value among the character correction values and subtracts 1 from the happy correction value (step S307), and proceeds to step S308.

If the longest presence area is not the anxiety area on the emotion map 300 (step S306; No), the processing unit 110 determined whether the longest presence area is a helplessness area on the emotion map 300 (specifically, the area whose X value is −100 or less) (step S308). If the longest presence area is the helplessness area on the emotion map 300 (step S308; Yes), the processing unit 110 adds 1 to the wanted correction value among the character correction values and subtracts 1 from the active correction value (step S309), and proceeds to step S310.

If the longest presence area is not the helplessness area on the emotion map 300 (step S308; No), the processing unit 110 determines whether the longest presence area is a central area on the emotion map 300 (specifically, the area in which absolute values of both the X value and the Y value are less than 100) (step S310). If the longest presence area is the central area on the emotion map 300 (step S310; Yes), the processing unit 110 decreases each of absolute values of all the four character correction values by 1 (step S311), and proceeds to step S312.

If the longest presence area is not the central area on the emotion map 300 (step S310; No), the processing unit 110 limits the range of the four character correction values (step S312). Specifically, the character correction value smaller than −5 is set to −5, and the character correction value larger than +5 is set to +5. Then, the processing unit 110 ends the character correction value adjustment process, and advances the process to step S115 in the movement control process.

With the above-described movement control process, basic characters (basic character data) are set through step S113 and step S201 for the simulated character of the robot 200 in the first period. After the lapse of the first period, the character value can be corrected without changing the basic characters through step S112 and step S209.

The character in the first period is associated with the emotion change data 122, that is, the moving speed of the emotion data 121 on the emotion map 300. In other words, the speed of change of the emotion is associated with the character, and thus, this is extremely natural as a method of expressing the character. Further, the emotion change data 122 changes only in the increasing direction in step S113, and thus, it can be considered that the character value reflects past information (the external stimulus received from the user in the first period or the like). Since all pieces of the four emotion change data 122 can be changed in step S113, a character obtained by combining the plurality of characters can also be constructed.

Further, the basic characters are fixed since the emotion change data 122 is fixed after the lapse of the first period. Since the correction value set in step S112 only increases or decreases by 1 based on the longest presence area of the day, the change in the character value caused by the correction value is a gradual change as compared with the change in the first period. If the robot 200 is neglected, the longest presence area becomes the central area, and thus, the correction value approaches 0, and the basic character is restored.

In FIG. 15, the character correction value adjustment process (step S112) is performed after it is determined in step S110 that the date has changed, that is, every time the period of one day elapses. However, this period is not limited to one day, and the character correction value adjustment process may be performed every time another period, such as half a day and one week, elapses. Further, the character correction value adjustment process may be performed every time the number of acquisitions of external stimuli reaches a predetermined number of times (for example, 50 times), instead of a fixed period such as one day.

Although the character correction value is adjusted based on the longest presence area on the emotion map 300 of the emotion data 121 during the period in the above-described character correction value adjustment process (FIG. 17), an adjustment method is not limited thereto. For example, the number of times the emotion data 121 is present in each of the plurality of areas on the emotion map 300 may be counted per unit time, and the character correction value may be adjusted based on an area where the number of times reaches a predetermined number of times.

Further, whether to learn the emotion change data 122 (to change and set the basic character data) is switched depending on whether the condition that the days-of-growth data 126 is in the first period is satisfied in steps S110 and S111 in the above-described movement control process. However, a condition for performing this switching is not limited to the condition that the days-of-growth data 126 is in the first period, and the switching may be performed depending on whether a predetermined condition related to the simulated growth degree of the robot 200 is satisfied.

For example, as this predetermined condition, a condition that "the largest value among the four character values is a predetermined value or more as the growth degree data representing the simulated growth degree of the robot 200" may be used instead of a condition that "the days-of-growth data 126 is equal to or more than a predetermined value" or together with this condition (under the OR condition). Further, this growth degree data may be set according to the number of days, may be set according to the number of times the external stimulus has been detected, may be set according to the character value, or may be set according to a value obtained by combining them (for example, the sum, an average value, or the like of them).

In the above-described movement selection process, the emotion data 121 may be referred to at the time of selecting the movement of the robot 200, and a value of the emotion data 121 may be reflected in the movement selection. For example, a plurality of the growth tables 123 may be prepared according to values of pieces of the emotion data 121 to set types of movements for abundantly expressing emotions. Then, a movement may be selected using the growth table 123 corresponding to a value of the emotion data 121 at that time, or a value of the movement selection probability of each movement recorded in the motion table 125 may be adjusted according to the value of the emotion data 121. As a result, the robot 200 can perform the movement reflecting the current emotion more.

If the determination in step S107 in FIG. 15 is Yes, the breathing movement or the movement accompanying the character is performed as the spontaneous movement in the movement selection process of step S106. In that case, however, the movement according to the X value and the Y value of the emotion data 121 may be performed.

Since the Y value of the emotion data 121 corresponds to the excitement degree in the positive direction and the helplessness degree in the negative direction, the volume of the crying sound output by the robot 200 may be changed according to the Y value. That is, the processing unit 110 may raise the volume of the crying sound output from the speaker 231 as the positive Y value of the emotion data 121 increases, and lower the volume of the crying sound output from the speaker 231 as the negative Y value decreases.

Further, a plurality of variations of the growth table 123 may be prepared depending on the use of the robot 200 (for example, use for emotional education for infants, use for conversation for the elderly, and the like). Further, the growth table 123 may be configured to be downloadable from an external server or the like via the communication unit 130 in order to change the use of the robot 200 or the like.

Although the largest value among the four character values is used as the growth value in the above-described movement selection process, the growth value is not limited thereto. For example, the growth value may be set based on the days-of-growth data 126 (for example, a value, obtained by dividing the days-of-growth data 126 by a predetermined value (for example, 10) and rounding off a digit after the decimal point, is used as the growth value or the like). In the robot 200 neglected by the user, the character value often remains small, and there may be a case where the character movement is not selectable in a case where the maximum value of the character value is set as the growth value. Even in such a case, the character movement is selected according to the days of growth regardless of the frequency of care by the user if the growth value is set based on the days-of-growth data 126. Further, the growth value may be set based on both the character value and the days-of-growth data 126 (for example, a value, obtained by dividing the sum of the largest value among the character values and the days-of-growth data 126 by a predetermined value and rounding off a digit after the decimal point, is used as the growth value or the like).

Although the character value is set based on the emotion change data 122 in the above-described embodiment, a method of setting the character value is not limited to this method. For example, the character value may be set directly from the external stimulus data without being set based on the emotion change data 122. For example, it is possible to consider a method of increasing the character value (active) in the case of being stroked and decreasing the character value (shy) in the case of being hit. Further, the character value may be set based on the emotion data 121. For example, it is possible to consider a method of setting a value, obtained by reducing each of the X value and the Y value of the emotion data 121 to ¹⁄₁₀, as the character value.

Figure 16:
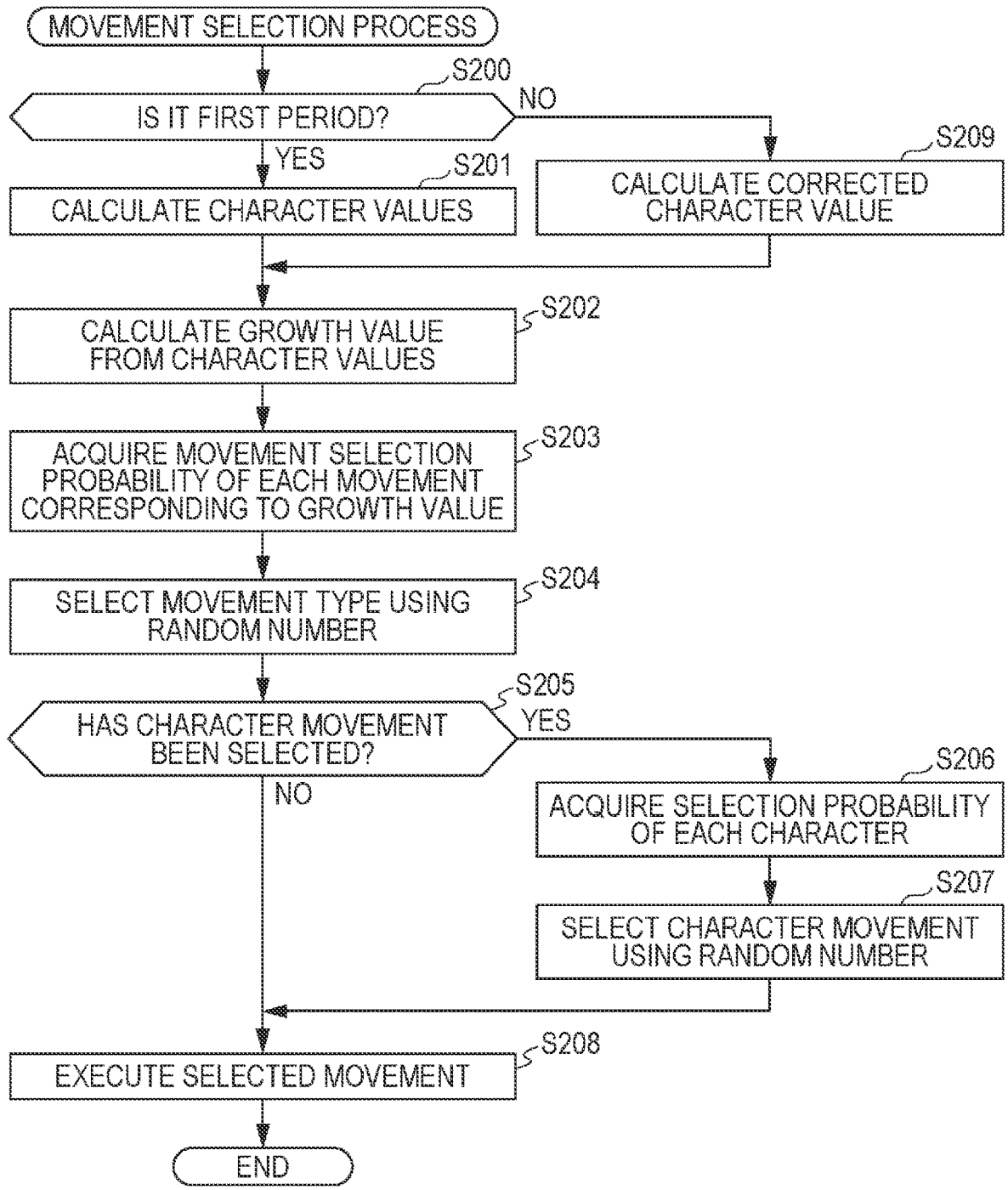
FIG. 16 is a flowchart of a movement selection process according to the embodiment.

According to the movement control process described above, whether the predetermined condition (for example, the condition that the days of growth represented by the days-of-growth data 126 exceeds the number of days in the first period) related to the growth degree of the robot 200 is satisfied is determined based on the growth degree data representing the simulated growth degree of the robot 200 such as the days-of-growth data 126 and the character value (step S111 in FIG. 15 and step S200 in FIG. 16); the external stimulus data representing the external stimulus that is externally applied to the robot 200 is acquired (step S103 in FIG. 15); in a case where the predetermined condition is not satisfied, the emotion change data 122 as the basic character data is learned (step S113 in FIG. 15) according to the first condition (condition for determining whether to change the emotion change data 122) based on the external stimulus data; the character value calculated from the emotion change data 122 is changed and set (step S201 in FIG. 16); in a case where the predetermined condition is satisfied, the character correction value is adjusted according to the second condition (condition for determining whether to correct the character after the size of the emotion map 300 is fixed), different from the first condition and is based on the external stimulus data (step S112 in FIG. 15); the emotion change data 122 as the basic character data is corrected with the adjusted character correction value to obtain the character value as the character data (step S209 in FIG. 16); and the movement of the robot 200 is controlled according to the character value calculated from the emotion change data 122 serving as the basic character data in the case where the predetermined condition is not satisfied, and is controlled according to the character value obtained by the correction in the case where the predetermined condition is satisfied (steps S202 to S208 in FIG. 16). As a result, the movement of the robot 200 can be appropriately controlled according to the simulated growth degree of the robot 200.

Since the processing unit 110 sets the character value according to the first condition based on the external stimulus data, the character value can be set more flexibly as compared with a case where the character value is set according to the external stimulus data regardless of the first condition. Further, the character value is set according to the second condition (different from the first condition) based on the external stimulus data in the case where the predetermined condition is satisfied. Thus, the character value can be set more precisely as compared with a case where the character value is set according to only the first condition based on the external stimulus data.

Since the processing unit 110 corrects the character value without changing the basic character data, even after the emotion change data 122 (basic character) is fixed, the character correction value changes based on how the user interacts with the robot 200 thereafter, and the robot 200 moves based on the character value corrected by the character correction value. Therefore, the robot 200 can perform various movements depending on the way of interaction with the user even after the setting of the basic character is completed. If the user neglects the robot 200, the longest presence area on the emotion map 300 becomes the central area, and the character correction value returns to 0. Thus, the robot 200 can perform the movement reflecting the original character after growth.

Further, the emotion change data 122 is learned according to the simulated emotion degree (for example, whether the emotion data 121 is set to the maximum value or the minimum value of the emotion map 300) of the robot 200 represented by the emotion data 121. Thus, in the case where the predetermined condition is not satisfied, the character value can be set according to the easiness of the change of the emotion by setting the first condition based on the external stimulus data as the condition related to the simulated emotion degree of the robot 200 represented by the emotion data 121.

Further, in the case where the predetermined condition is satisfied, the character value can be corrected according to the occurrence frequency of the simulated emotion (for example, the longest presence area) by setting the second condition based on the external stimulus data as the condition related to the occurrence frequency of the simulated emotion of the robot 200 represented by the emotion data 121.

In the case where the predetermined condition is satisfied (step S111 in FIG. 15; No), the processing unit 110 fixes the basic character data (step S113 in FIG. 15 is not executed); changes the character correction value for correcting the basic character data according to the second condition based on the external stimulus data (step S112 in FIG. 15); and controls the movement of the robot 200 according to the character data (step S209 in FIG. 16) obtained by correcting the basic character data using the character correction value (steps S202 to S208 in FIG. 16). Therefore, the processing unit 110 fixes the basic character in the case where the predetermined condition is satisfied, and thus, the robot can have personality (a unique character). Since the processing unit 110 corrects the character value without changing the basic character and controls the robot 200 based on the corrected character value, the user can enjoy how the reaction of the robot 200 changes according to the way of interaction even after the setting of the basic character of the robot 200 is completed.

In the case where the predetermined condition is not satisfied (step S111 in FIG. 15; Yes), the processing unit 110 learns the emotion change data 122 according to the first condition based on the external stimulus data to change and set the emotion change data 122 (step S113 in FIG. 15). Therefore, the processing unit 110 can set the basic character of the robot 200 according to how the user interacts with the robot 200 in the case where the predetermined condition is not satisfied.

Since the condition that "the days-of-growth data 126 which is data representing the days of growth has exceeded the first period (for example, 50 days)" is set as the predetermined condition related to the growth degree of the robot 200, the simulated growth of the robot 200 is limited to only the first period (for example, 50 days), and the emotion change data 122 (character) is fixed thereafter. Thus, it is difficult to reset the robot 200 like other ordinary devices, and it is possible to make the user feel as if he or she really interacts with a living pet.

Since the condition that "the number of acquisitions of the external stimulus data has exceeded the predetermined number of times (for example, 5000 times)" is set as the predetermined condition related to the growth degree of the robot 200, the speed of the simulated growth of the robot 200 can be appropriately controlled. For example, the speed of the simulated growth of the robot 200 increases if the user frequently takes care of the robot 200, and the speed of the simulated growth of the robot 200 decreases if the user neglects the robot 200.

Since the condition that "the largest value among the plurality of character values is equal to or more than the predetermined value (for example, 10)" is set as the predetermined condition related to the growth degree of the robot 200, the simulated character of the robot 200 can be set to the character strongly reflecting the character value that has reached the maximum value earliest.

Since the emotion change data 122 that changes the emotion data 121 is learned according to the external stimulus, the individual robots 200 represent different emotion changes in response to the external stimuli, and as a result, the individual robots 200 can have the simulated characters (character values). Since the character is derived from the emotion change data 122, it is possible to generate a clone robot having the same character by copying the emotion change data 122. For example, if backup data of the emotion change data 122 is stored, the robot 200 having the same character can be reproduced by restoring the backup data even in the case where the robot 200 breaks down.

Since the simulated emotion is represented by a plurality of pieces of the emotion data (X and Y of the emotion data 121), and the simulated character is represented by a plurality of pieces of the emotion change data (DXP, DXM, DYP, and DYM of the emotion change data 122), it is possible to express complex emotions and characters.

Then, the emotion change data 122 for deriving this simulated character is learned according to each of a plurality of external stimuli of types different from each other acquired by the plurality of sensors included in the sensor unit 210, and thus, it is possible to create a wide variety of the simulated characters depending on how the user interacts with the robot 200

As the growth value calculated based on the character values increases, the variations of the movements that can be selected become abundant. Thus, it is possible to express more abundant movements as the robot 200 grows in a pseudo manner (the growth value increases). Further, the robot 200 does not select only the movement after growth as growing more and more, but can select a movement from all the movements that have been performed so far according to the movement selection probability defined in the growth table 123. Therefore, the user can sometimes see the movement at the time of purchase even after the growth of the robot 200, and can feel more affection.

Next, the sleep function, the alarm function, and a co-sleeping function of the robot 200 will be described in order.

Since the robot 200 moves using the battery as the power source, energy-saving control is required. In order to give the feeling like a living thing, such as a pet, it is better to perform control such that the robot 200 looks as if sleeping instead of simply stopping the movement. Hereinafter, a control mode for controlling the robot 200 such that the robot 200 looks as if sleeping is referred to as the sleep control mode. Through the sleep control mode, the sleep function is implemented as a function that makes the robot 200 look as if sleeping. In a case where a certain sleep condition, such as darkening of the surroundings, is satisfied, the robot 200 transitions to a sleep state by stopping the thread of the movement control process illustrated in FIG. 15, and suppresses power consumption. In a case where a specific external stimulus is acquired thereafter (or in a case where alarm time comes), the thread of the movement control process that has been stopped is restarted to transition to the normal state. The normal state is a state in which all threads necessary for the normal movement in the robot 200, such as the thread of movement control process, are operating, and refers to a state in which the breathing movement is periodically performed or the movement in response to the external stimulus is performed.

Basically, in a case of detecting that the condition (a second sleep condition) that the surroundings have become dark is satisfied by the illuminance sensor, the robot 200 enters the sleep control mode (transitions from the normal state to the sleep state) for suppressing the power consumption (particularly energy consumption consumed by the drive unit 220 and the output unit 230). Once entering the sleep control mode, the robot 200 does not transition from the sleep state to the normal state even if the surroundings become bright thereafter in order to achieve reliable energy saving.

In the sleep state in the normal sleep control mode of the embodiment, in a case where the user embraces the robot 200 with the head 204 up, strokes the robot 200, or calls the robot 200 with a loud sound, the robot 200 cancels the sleep control mode and transitions from the sleep state to the normal state. Note that an external stimulus that cancels the normal sleep control mode (here, the external stimulus such as "being embraced with the head 204 up", "being stroked", or "hearing a loud sound") is also referred to as a normal stimulus, and a normal sleep state is also referred to as a second sleep state.

However, there may be a situation in the transition from the sleep state to the normal state is not desired basically, for example, in a case where the battery of the robot 200 is to be fully charged or in a case where the user goes out with the robot 200. For such a situation, the robot 200 also has a sleep control mode (hereinafter referred to as a "hard sleep control mode") in which it is difficult to transition to the normal state.

In the embodiment, in a case where a first sleep condition is satisfied, the robot 200 enters the hard sleep control mode (transitions from the normal state to a hard sleep state). The first sleep condition is satisfied in a case where any of the following two conditions is satisfied.

(1) The surroundings have become dark during charging.
(2) The surroundings have become dark in a state in which the robot 200 is made to stand by the user (held with the head 204 up).

However, even if the surroundings are not actually dark, the illuminance detected by the illuminance sensor 214 decreases if the illuminance sensor 214 is hidden by a hand during charging or in the state in which the user makes the robot 200 stand. Thus, the robot 200 determines that the first sleep condition is satisfied and enters the hard sleep control mode.

In the hard sleep control mode, the robot 200 does not transition to the normal state even if the user strokes the robot 200 or calls the robot 200 with a loud sound. However, in order to give the feeling like a living thing, the processing unit 110 can also transition to a semi-sleep state in response to detection of a predetermined specific external stimulus (external stimulus "being stroked" in the embodiment), control the drive unit 220 and the output unit 230, and then, return to the hard sleep state again. Thus, a plurality of levels (hereinafter referred to as "sleep levels") are prepared in the hard sleep control mode. In the semi-sleep state, a first suppression mode is executed in which the drive unit 220 and the output unit 230 are controlled such that the power consumption is suppressed as compared with the normal state (in the embodiment, a sleeping sound is output or the breathing movement is performed). In the hard sleep state, a second suppression mode is executed in which the drive unit 220 and the output unit 230 are controlled such that the power consumption is further suppressed as compared with the semi-sleep state (in the embodiment, the drive unit 220 is stopped and the output unit 230 is prevented from outputting anything).

Sleep level 1 is a control mode in which the feeling like a living thing disappears, but the power consumption can be suppressed most, and the robot 200 does not move at all until the hard sleep control mode is canceled.

Sleep level 2 is a mode in which the drive unit 220 is not operated and the feeling like a living thing is given only by a sound in response to reception of a specific external stimulus. In the embodiment, the robot 200 transitions to the semi-sleep state in a case of being stroked by the user, outputs the sleeping sound from the speaker 231 for a predetermined time (for example, 5 seconds), and then, returns to the hard sleep state again. Note that the semi-sleep state is a state in which the robot 200 executes the first suppression mode (temporarily moves or outputs a sound) in order to give the feeling like a living thing in the hard sleep control mode. Although the robot 200 temporarily moves or outputs the sound in the semi-sleep state (during the execution of the first suppression mode), the thread of the movement control process illustrated in FIG. 15 is kept stopped, and continuous driving of the motor that consumes power, a large movement, output of a loud sound, or the like is not executed. Thus, the movement according to the external stimulus and the spontaneous operation are suppressed, and the energy consumption consumed by the drive unit 220 and the output unit 230 can be suppressed as compared with the normal state.

Sleep level 3 is a mode in which the drive unit 220 is operated to give the feeling like a living thing more in response to reception of a specific external stimulus. In the embodiment, the robot 200 transitions to the semi-sleep state for a predetermined time (for example, 5 seconds) in the case of being stroked by the user, drives the drive unit 220, performs the breathing movement, and then, returns to the hard sleep state again.

In this manner, the robot 200 transitions to the semi-sleep state to take a sleeping breath or perform the breathing movement if acquiring a specific external stimulus (also referred to as a second stimulus) such as being stroked by the user in a case where the sleep level is 2 or 3 even in the hard sleep control mode for suppressing the power consumption. Thus, the user can feel as if the robot 200 is a real creature. In a case where the semi-sleep state continues for a predetermined time, the state returns from the semi-sleep state to the hard sleep state, and thus, the state of suppressing the power consumption can be continued. Although the sound output in the semi-sleep state is the sleeping sound in the embodiment, other sounds such as the breathing sound may be output. Further, the sleeping or breathing sound may be output in addition to the breathing movement in the semi-sleep state.

Note that any method can be set as a method of canceling the hard sleep control mode, but the robot 200 cancels the hard sleep control mode and transitions to the normal state if the user holds the robot 200 in an upright state (holds the robot 200 with the head 204 up) in the embodiment. Note that an external stimulus that cancels the hard sleep control mode (here, the external stimulus such as "being made to stand with the head 204 up") is also referred to as a first stimulus, and the hard sleep state is also referred to as a first sleep state.

Then, in the hard sleep control mode, the processing unit 110 executes the second suppression mode in which the drive unit 220 and the output unit 230 are controlled (not to move at all and not to output a sound in the present embodiment) such that the power consumption of the battery is suppressed as compared with the first suppression mode described above while neither the above-described specific external stimulus nor the first stimulus are detected. The second suppression mode is not limited to the complete stop, and a movement and output of a sound that can suppress the power consumption of the battery as compared with the case where the first suppression mode is executed may be performed. Since the robot 200 can express the movement according to the specific external stimulus by the first suppression mode, it is possible to further improve the feeling like a living thing. Further, the robot 200 can further suppress the energy consumption by the second suppression mode.

Next, the alarm function and the co-sleeping function of the robot 200 will be described. As illustrated in FIG. 1, the robot 200 has the appearance like a stuffed toy, and thus, the user can also sleep with the robot 200 while embracing the robot 200.

In this case, the robot 200 can wake up the user by moving the drive unit 220 without outputting a sound. An alarm sound of a normal alarm clock often makes a user uncomfortable. However, it is considered that there are many users who do not feel so unpleasant if the robot 200 sleeping together wakes up the users by moving sluggishly.

The robot 200 provides such an alarm function. However, if the robot 200 moves in the case where the user unconsciously strokes the robot 200 while sleeping, the user may be awakened. Therefore, a function of stopping the movement of the robot 200 while the robot 200 is sleeping with the user is the co-sleeping function. However, the co-sleeping function is implemented in the embodiment by executing the suppression mode (hard sleep control mode in the embodiment) for suppressing the energy consumption consumed by the drive unit 220 and the output unit 230 of the robot 200 instead of simply stopping the movement of the robot 200. As a result, it is possible to achieve both preventing the user from waking up while sleeping and suppressing the power consumption.

Since the robot 200 does not have a display screen or the like, the alarm function and the co-sleeping function are set by the user using an application program of a smartphone connected via the communication unit 130 of the robot 200. FIG. 18 illustrates an example of a setting screen of the alarm function and the co-sleeping function in the application program of the smartphone.

As illustrated in FIG. 18, from a screen 501 of the smartphone, the user can input alarm time, ON/OFF of alarm per day of the week, movement strength of the robot 200 at the time of the alarm, ON/OFF of a crying sound of the robot 200 at the time of the alarm, the number of snoozes (snooze OFF if 0 times), a co-sleeping mode level (corresponding to a level (sleep level) of the hard sleep control mode), co-sleeping start time (time to start the co-sleeping function, which is also referred to as sleep start time), and the like, and transmit these to the robot 200. Accordingly, various setting values of the alarm function and the co-sleeping function can be input to the robot 200.

Note that FIG. 18 illustrates an example in which these pieces of setting data are set on the single screen 501. Among them, the alarm time, ON/OFF per day of the week, the alarm movement strength, the crying sound ON/OFF, and the number of snoozes are setting values related to the alarm function, and thus, are referred to as alarm setting data. Further, the co-sleeping mode level and the co-sleeping start time are setting values related to the co-sleeping function, and thus, are referred to as co-sleeping setting data. In the application program of the smartphone, screens may be designed such that a setting screen of the alarm setting data and a setting screen of the co-sleeping setting data are different screens. Note that the alarm movement is a movement in which the robot 200 moves sluggishly by the drive unit 220 or makes a crying sound by the speaker 231 in the case where the alarm time (time when the alarm is set) comes.

Figure 19:
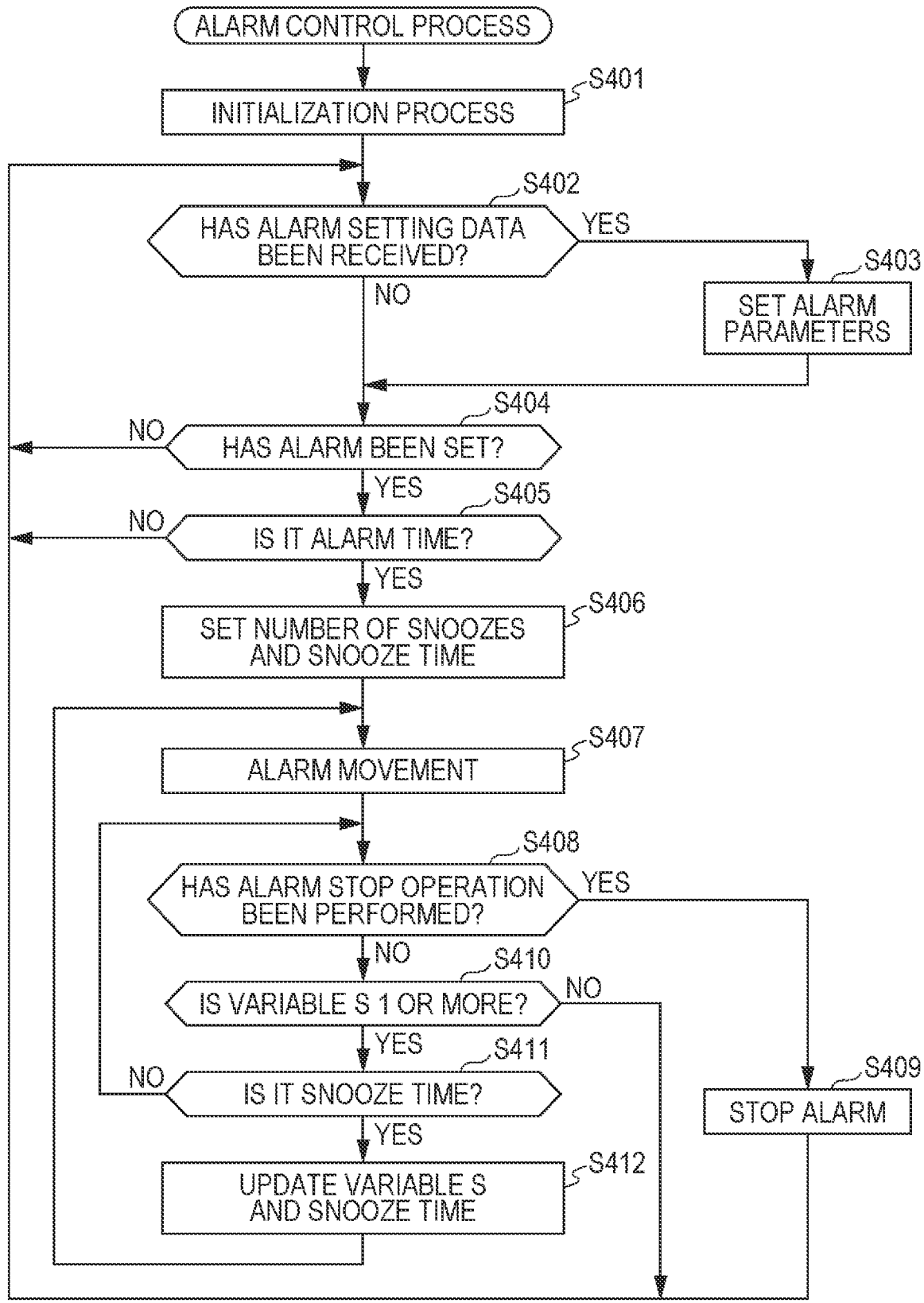
FIG. 19 is a flowchart of an alarm control process according to the embodiment.

Next, the alarm control process for implementing the alarm function of the robot 200 will be described with reference to a flowchart illustrated in FIG. 19. In a case where the user turns on the power of the robot 200, this alarm control process is started in parallel with the above-described movement control process, the sleep control process to be described later, or the like.

First, the processing unit 110 initializes various parameters (alarm parameters) related to the alarm function such as the alarm time (step S401). Note that the alarm parameters may be stored in the flash memory of the storage unit 120 to prevent these values from being initialized every time the power of the robot 200 is turned on.

Next, the processing unit 110 determines whether the alarm setting data has been received from the smartphone via the communication unit 130 (step S402). If the alarm setting data has been received (step S402; Yes), the processing unit 110 sets the alarm parameters based on the received alarm setting data (step S403), and proceeds to step S404.

If the alarm setting data has not been received (step S402; No), the processing unit 110 determines whether the alarm parameters have been set (step S404). If the alarm parameters have not been set (step S404; No), the processing unit 110 returns to step S402.

If the alarm parameters have already been set (step S404; Yes), the processing unit 110 determines whether the current time is the alarm time and the day of the week of today is set to alarm ON using the clock function (step S405). If the current time is not the alarm time or the day of the week of today is not set to alarm ON (step S405; No), the processing unit 110 returns to step S402.

If the current time is the alarm time and the day of the week of today is set to alarm ON (step S405; Yes), the processing unit 110 sets the number of snoozes set in the alarm parameters to a variable S and sets the snooze time (for example, 5 minutes after the alarm time) (step S406). Then, the processing unit 110 executes the alarm movement by controlling the drive unit 220 and the speaker 231 based on values of the alarm movement strength and the crying sound ON/OFF set in the alarm parameters (step S407). In a case where the thread of the above-described movement control process is temporarily stopped by the sleep control process to be described later, the processing unit 110 also performs a process of waking up the thread of the movement control process in step S407.

As the alarm movement is executed, the robot 200 moves sluggishly by the drive unit 220 or outputs the crying sound by the speaker 231. This allows the user to wake up naturally without feeling uncomfortable. In a case where the movement control process thread is restarted, the robot 200 is set in the normal state, so that the robot 200 resumes the breathing movement and reacts, for example, if being stroked by the user. Therefore, even if it is difficult for the user to wake up by the alarm movement, the user can wake up by the subsequent breathing movement or natural reaction of the robot 200.

Then, the processing unit 110 determines whether an alarm stop operation has been performed (step S408). Although any operation can be defined as the alarm stop operation, it is determined that the alarm stop operation has been performed if the user lifts the head of the robot 200 to make the robot 200 stand in the embodiment.

If the user performs the alarm stop operation (step S408; Yes), the processing unit 110 stops the alarm movement in response to the alarm stop operation (step S409), and returns to step S402.

If the alarm stop operation has not been performed by the user (step S408; No), the processing unit 110 determines whether a value of the variable S in which the number of remaining snoozes is set is one or more (step S410). If the value of the variable S is zero (step S410; No), the processing unit 110 returns to step S402.

If the value of the variable S is one or more (step S410; Yes), the processing unit 110 determines whether the current time is the snooze time (step S411). If it is not the snooze time (step S411; No), the processing unit 110 returns to step S408.

If it is the snooze time (step S411; Yes), the processing unit 110 decreases the value of the variable S by one, updates the snooze time (for example, set after 5 minutes) (step S412), and returns to step S407.

Figure 20:
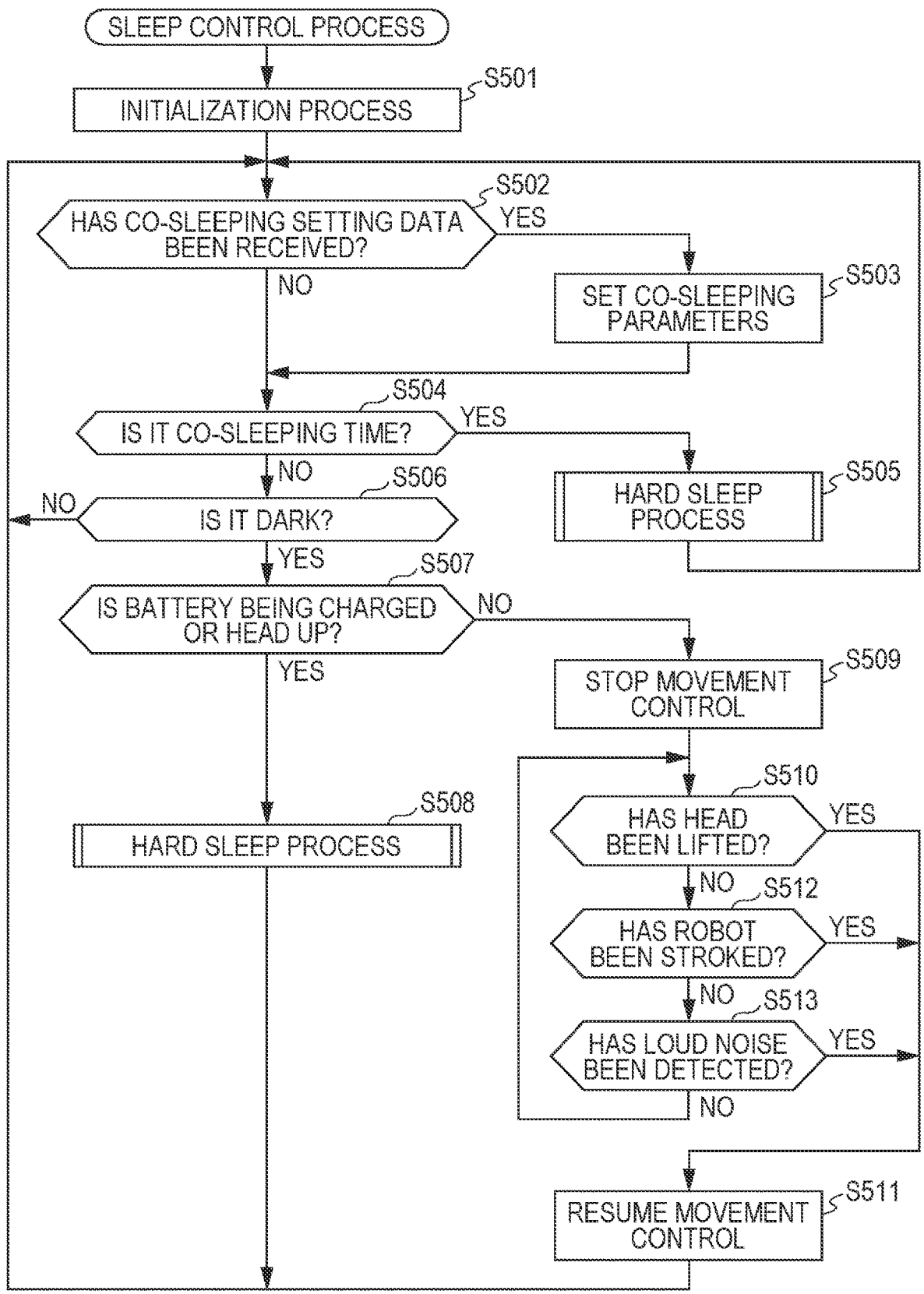
FIG. 20 is a flowchart of a sleep control process according to the embodiment.

Next, the sleep control process for implementing the sleep control mode and the co-sleeping function of the robot 200 will be described with reference to a flowchart illustrated in FIG. 20. In the case where the user turns on the power of the robot 200, this sleep control process is started in parallel with the above-described movement control process, alarm control process, or the like.

The co-sleeping function in the embodiment is a function that executes the hard sleep control mode (suppression mode) assuming that the robot 200 is in the state of sleeping with the user at the set co-sleeping start time. As described above, the hard sleep control mode is executed even in the case where the user hides the illuminance sensor 214 by the hand in the state where the robot 200 is made to stand, and thus, the user can also manually execute the co-sleeping function by this operation. That is, a condition for execution of the suppression mode is that the current time is the co-sleeping start time, or the above-described first sleep condition is satisfied in the embodiment. Further, three sleep levels are prepared in the hard sleep control mode, and the sleep level is set by setting a co-sleeping mode level.

In a case where the sleep control process is started, first, the processing unit 110 initializes various parameters (hereinafter referred to as "sleep parameters") related to the sleep control mode such as a level (sleep level) of the hard sleep control mode, and various parameters (hereinafter referred to as "co-sleeping parameters") related to the co-sleeping function such as a co-sleeping mode level and the co-sleeping start time (step S501). Values at the time of initialization are, for example, "Level 1" in the sleep level and the co-sleeping mode level, and "not set" in the co-sleeping start time. Note that these parameters may be stored in the flash memory of the storage unit 120 to prevent these values from being initialized every time the power of the robot 200 is turned on.

Next, the processing unit 110 determines whether the co-sleeping setting data has been received from the smartphone via the communication unit 130 (step S502). If the co-sleeping setting data has been received (step S502; Yes), the processing unit 110 sets the co-sleeping parameters based on the received co-sleeping setting data (step S503), and proceeds to step S504. In steps S502 and S503, the sleep parameters may be received and set in the same manner as the co-sleeping parameters. However, the sleep level uses the same value as the co-sleeping mode level set in the co-sleeping setting data in the embodiment.

If the co-sleeping setting data has not been received (step S502; No), the processing unit 110 determines whether the current time is the co-sleeping start time set in step S503 (step S504). If the co-sleeping setting data was not received at all in the past, the co-sleeping start time is "not set", and the determination in step S504 is not Yes. If the current time is the co-sleeping start time (step S504; Yes), the processing unit 110 determines that a condition for execution of the co-sleeping function is satisfied, and executes a hard sleep process to be described later in order to execute the co-sleeping function (step S505). Since the condition for execution of the co-sleeping function is determined based on the time in this manner, the robot 200 can reliably execute the co-sleeping function at the co-sleeping start time. Then, the processing unit 110 returns to step S502.

If the current time is not the co-sleeping start time (step S504; No), the processing unit 110 determines whether the brightness detected by the illuminance sensor 214 is darker than a reference illuminance (step S506). If the illuminance sensor 214 detects the brightness equal to or more than the reference illuminance (step S506; No), the processing unit 110 returns to step S502.

If the illuminance sensor 214 detects the brightness less than the reference illuminance (step S506; Yes), the processing unit 110 determines whether the battery 253 is being charged or the head 204 is lifted (step S507). If the battery 253 is being charged or the head 204 is lifted (step S507; Yes), only the brightness less than the reference illuminance has been detected (step S506; Yes) in the state where the battery is being charged or the head 204 is lifted (step S507; Yes). Thus, the processing unit 110 determines that the first sleep condition is satisfied, executes the hard sleep process to be described later (step S508), and returns to step S502.

If the battery 253 is not being charged and the head 204 is not lifted (step S507; No), the processing unit 110 determines that the second sleep condition is satisfied since only the brightness less than the reference illuminance has been detected (step S506; Yes), and temporarily stops the thread of the above-described movement control process (step S509). As a result, the robot 200 transitions to the second sleep state and stops the normal movement (stops the drive unit 220 and stops the sound output from the speaker 231), so that the power consumption can be suppressed.

Then, the processing unit 110 determines whether the head 204 has been lifted (step S510). If the head 204 is lifted (step S510; Yes), the processing unit 110 resumes the movement control process thread temporarily stopped in step S509 (step S511), and returns to step S502.

If the head 204 has not been lifted (step S510; No), the processing unit 110 determines whether the robot 200 has been stroked (step S512). If the robot 200 has been stroked (step S512; Yes), the processing unit 110 proceeds to step S511.

If the robot 200 has not been stroked (step S512; No), the processing unit 110 determines whether a loud sound has been detected (step S513). If a loud noise has been detected (step S513; Yes), the processing unit 110 proceeds to step S511.

If no loud noise has been detected (step S513; No), the processing unit 110 returns to step S510.

Figure 21:
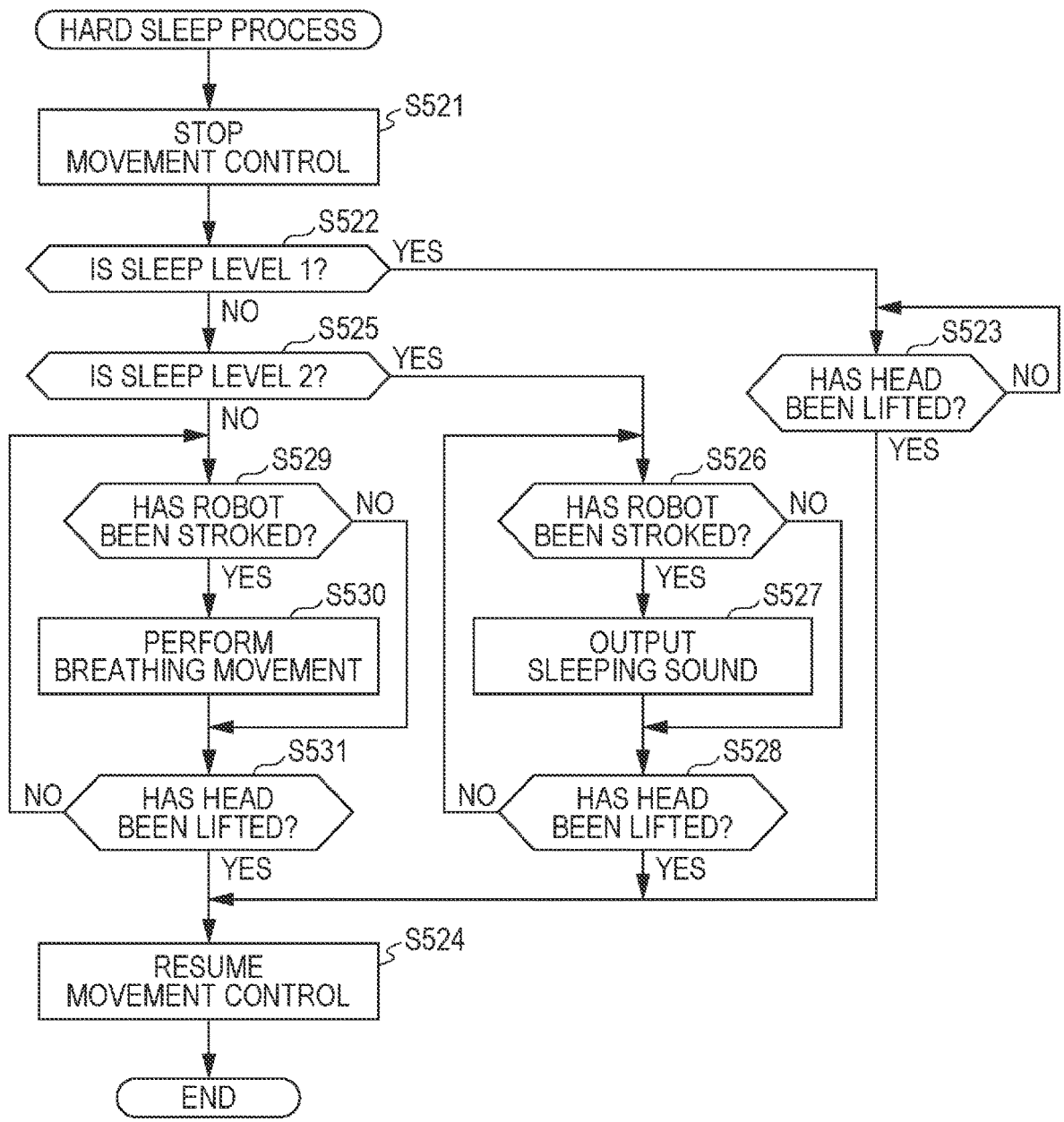
FIG. 21 is a flowchart of a hard sleep process according to the embodiment.

Next, the hard sleep process executed in step S505 and step S508 during the above process will be described with reference to FIG. 21.

First, the processing unit 110 temporarily stops the thread of the above-described movement control process (step S521). As a result, the robot 200 transitions to the hard sleep state and stops the normal movement (stops the drive unit 220 and stops the sound output from the speaker 231), so that the power consumption can be suppressed. Since a part of the condition for starting the hard sleep process and the condition for ending the hard sleep process are common (the head 204 has been lifted) in the present embodiment, the processing unit 110 may perform processing or a determination for preventing the end of hard sleep process immediately after the start of the hard sleep process although omitted in FIG. 21. For example, the processing unit 110 may wait between step S521 and step S522 in FIG. 21 until a state where the head 204 is not lifted is formed. Further, the determination condition for the end of the hard sleep state (steps S523, S528 and S531 in FIG. 21) may be "brightness equal to or more than the reference illuminance has been detected by the illuminance sensor 214 and the head 204 has been lifted".

Next, the processing unit 110 determines whether the sleep level set by the user as illustrated in FIG. 18 (in the embodiment, the same as the co-sleeping mode level set in step S503) is 1 (step S522). If the sleep level is 1 (step S522; Yes), the processing unit 110 determines whether the head 204 has been lifted (step S523). If the head 204 has not been lifted (step S523; No), the processing unit 110 returns to step S523.

If the head 204 has been lifted (step S523; Yes), the processing unit 110 resumes the movement control process thread temporarily stopped in step S521 (step S524), ends the hard sleep process, and returns to step S502 in the sleep control process.

On the other hand, if the sleep level is not 1 in step S522 (step S522; No), the processing unit 110 determines whether the sleep level is 2 (step S525). If the sleep level is 2 (step S525; Yes), the processing unit 110 determines whether the robot 200 has been stroked (step S526). If the robot 200 has not been stroked (step S526; No), the processing unit 110 proceeds to step S528. If the robot 200 has been stroked (step S526; Yes), the processing unit 110 transitions to the semi-sleep state, outputs the sleeping sound from the speaker 231, and returns to the hard sleep state (step S527). At this time, the thread of the movement control process is still stopped and only the sleeping sound is output. Thus, in step S527, the power consumption can be suppressed as compared with the normal state.

Then, the processing unit 110 determines whether the head 204 has been lifted (step S528). If the head 204 has not been lifted (step S528; No), the processing unit 110 returns to step S526. If the head 204 has been lifted (step S528; Yes), the processing unit 110 proceeds to step S524.

On the other hand, if the sleep level is not 2 in step S525 (step S525; No), the sleep level is 3, and the processing unit 110 determines whether the robot 200 has been stroked (step S529). If the robot 200 has not been stroked (step S529; No), the processing unit 110 proceeds to step S531. If the robot 200 has been stroked (step S529; Yes), the processing unit 110 transitions to the semi-sleep state, controls the drive unit 220 for a predetermined time (for example, 1 minute) to cause the robot 200 to perform the breathing movement, and returns to the hard sleep state (step S530). At this time, the thread of the movement control process is still stopped, and the movement of the drive unit 220 in the breathing movement is smaller than the movement in the normal state. Thus, the power consumption can be suppressed as compared with the normal state although the breathing movement is performed in step S530.

Then, the processing unit 110 determines whether the head 204 has been lifted (step S531). If the head 204 has not been lifted (step S531; No), return to step S529. If the head 204 has been lifted (step S531; Yes), the processing unit 110 proceeds to step S524.

Through the alarm control process described above, the robot 200 can naturally wake up the user by its movement without outputting the alarm sound. Further, the robot 200 enters the hard sleep control mode after the co-sleeping start time by the sleep control process, and thus, does not perform an unnecessary movement that wakes up the user, so that the user can sleep together with the robot 200 with a sense of security. Since the robot 200 stops the movement control process illustrated in FIG. 15 in the sleep control mode, the power consumption can be suppressed. Further, not only the normal sleep control mode but also the hard sleep control mode in which it is difficult to transition to the normal state is prepared in the sleep control process, and thus, the power consumption of the robot 200 can be more reliably suppressed according to a situation such as during charging and going out.

In the above-described sleep control process, the processing unit 110 determines whether the current time is the co-sleeping start time in step S504, and determines that the condition for execution of the co-sleeping function is satisfied if it is the co-sleeping start time, and starts the co-sleeping function (hard sleep process). However, the timing for starting the co-sleeping function is not limited to the co-sleeping start time. For example, as the co-sleeping setting data, a period during which the user sleeps may be set as a "co-sleeping period" instead of the co-sleeping start time or in addition to the co-sleeping start time. Then, if the current time is included in the "co-sleeping period", the processing unit 110 may determine that the condition for execution of the co-sleeping function is satisfied. Further, the condition for execution of the co-sleeping function is not limited to the condition based on the co-sleeping setting data such as the co-sleeping start time, and any condition related to the user's sleep can be set.

For example, a description will be given regarding an example in which the user wears biometric information detection device including a biosensor (sensor that detects the user's biometric information such as a pulse) (for example, a wristwatch incorporating a biosensor). In this case, in step S504, the processing unit 110 may acquire a signal from the biometric information detection device, determine that the condition for execution of the co-sleeping function is satisfied if it is determined that the user is sleeping based on the acquired signal, and start the co-sleeping function. In the case where the biometric information detection device determines whether the user is sleeping based on the biometric information, the signal from the biometric information detection device indicates a value of either "sleeping" or "not sleeping". In this example, the user needs to wear the biometric information detection device, but the co-sleeping function can be started even in the case where the co-sleeping start time is not set or in the case where the user starts co-sleeping with the robot 200 at time different from the co-sleeping start time.

Further, even if the user does not wear the biometric information detection device, the co-sleeping function may be started in a case where the user's sleeping breath is detected by the microphone 213. In this case, in step S504, the processing unit 110 may analyze the sound data detected by the microphone 213, determine that the condition for execution of the co-sleeping function is satisfied if it is determined that the sound is the sleeping breath of the user as a result of the analysis, and start the co-sleeping function. Further, for example, the robot 200 may include an image acquisition unit such as a camera including a charge-coupled device (CCD) image sensor or the like, and the processing unit 110 may perform image analysis on an image acquired by the image acquisition unit, determine that the condition for execution of the co-sleeping function is satisfied if it is determined as a result of the image analysis that the image has a sleeping face of the user, and start the co-sleeping function.

For example, the co-sleeping function may be started in a case where the user gives a co-sleeping command (for example, sounds such as "Let's sleep together" and "Take a sleep"). In this case, in step S504, the processing unit 110 may performs voice recognition of the sound data detected by the microphone 213, determine that the condition for execution of the co-sleeping function is satisfied if a result of the recognition is the co-sleeping command, and start the co-sleeping function. Further, it may be determined that the condition for execution of the co-sleeping function is satisfied to start the co-sleeping function if the surroundings are dark and a silent state continues for a co-sleeping reference time (for example, 10 minutes) based on detection results of the microphone 213 and the illuminance sensor 214. Then, it is possible to execute the co-sleeping function even if the co-sleeping start time is not set.

In the above-described embodiment, the predetermined specific external stimulus is set as "being stroked", and the processing unit 110 determines that the external stimulus is the specific external stimulus in the case where the user strokes the robot 200, but the specific external stimulus is not limited to being stroked. For example, the robot 200 may include an image acquisition unit such as a CCD image sensor, and the processing unit 110 may perform image recognition of an image acquired by the image acquisition unit, and the processing unit 110 may determine that an external stimulus is a specific external stimulus in the case of recognizing that the user's gaze is directed to the robot 200.

As described above, even in the suppression mode for suppressing the power consumption of the battery, the robot 200 can execute the first suppression mode in which the movement or the sound output is performed in response to the specific external stimulus while suppressing the power consumption. Thus, it is possible to perform control so as to precisely react and move in response to the external stimulus. Further, the robot 200 can execute the co-sleeping function, which is the function of performing co-sleeping without disturbing the user's sleep, by executing the suppression mode according to the time when the user sleeps. Further, the robot 200 can more reliably execute the co-sleeping function by executing the suppression mode if determining that the user is sleeping by the biosensor, the microphone 213, the camera, or the like. Further, the robot 200 takes a sleeping breath or performs the breathing movement in the case of being stroked by the user, so that the user can feel as if the robot 200 is a real creature. Further, the robot 200 performs the alarm movement at the alarm time to move sluggishly by the drive unit 220 or output the crying sound by the speaker 231. This allows the user to wake up naturally without feeling uncomfortable.

Next, the power control of the robot 200 will be described. As described above, the robot 200 includes the power control unit 250, and the power control unit 250 performs charging of the battery 253 and ON/OFF control of the power. Since the power control unit 250 can perform the ON/OFF control of the power, the robot 200 can turn the power on and off by itself even if the user does not use a power switch. The power control unit 250 can be also considered as a power control apparatus that controls the power of the robot 200.

For example, the robot 200 automatically turns off the power in a case where the battery voltage becomes lower than a predetermined voltage (movement reference voltage), and automatically turns on the power in a case where the battery voltage becomes equal to or higher than a predetermined voltage (activation reference voltage). If the battery voltage is equal to or higher than the predetermined voltage (movement reference voltage) in the case where the power is turned on, the power ON is maintained. As a result, it is possible to further improve the feeling like a living thing as compared with other devices whose power needs to be turned on and off manually by the user.

However, it is also possible to consider a case where the user desires to manually turn off the power of the robot 200, for example, a case where the user desires to charge the battery In as short a time as possible. In such a case, there occurs a problem if the power of the robot 200 is automatically turned on. In such a case, the power control unit 250 also performs control to prevent the power of the robot 200 from being automatically turned on.

As illustrated in FIG. 9, the power control unit 250 includes the sub-microcomputer 251, a charging integrated circuit (IC) 252, the battery 253, a power control IC 254, and the wireless power supply receiving circuit 255.

The sub-microcomputer 251 is a microcontroller incorporating a processor with low power consumption, and includes: an analog-to-digital (AD) converter 2511 that monitors an output voltage of the battery 253; an input port 2512 that monitors a charging signal indicating whether the battery 253 is being charged by the charging IC 252; a power terminal 2513 of the sub-microcomputer 251; an input port 2514 that monitors a pressing status of the power switch 241 of the robot 200; an output port 2515 that outputs a movement restriction signal to the processing unit 110; and an output port 2516 that outputs, to the power control IC 254, a power control signal for controlling ON/OFF of power supplied to the main functional unit 290.

The charging IC 252 is an IC that receives supply of power from the wireless power supply receiving circuit 255 and performs control to charge the battery 253. The charging IC 252 outputs the charging signal indicating whether the battery 253 is being charged to the sub-microcomputer 251.

The battery 253 is a rechargeable secondary battery that supplies power required for the movement of the robot 200.

The power control IC 254 is an IC that controls whether the power from the battery 253 is supplied to the main functional unit 290 of the robot 200. An input port 2541 that receives a power control signal from the sub-microcomputer 251 is provided, and power supply to the main functional unit 290 is performed or stopped according to ON/OFF of the power control signal.

The wireless power supply receiving circuit 255 receives power from the external wireless charging device 256 by electromagnetic induction, and supplies the received power to the charging IC 252.

The power switch 241 is a switch configured to turn on and off the power of the robot 200. Even in the case where the power of the robot 200 is turned off, the power control unit 250 is supplied with the power in order to perform control to charge the battery 253 or to automatically turn on the power of the robot 200 after completion of the charging. Thus, from the viewpoint of the power supply, it is possible to consider that the robot 200 has two units, that is, the power control unit 250 to which the power is constantly supplied and the main functional unit 290 for which ON/OFF of the power is controlled by the power control unit 250.

The main functional unit 290 includes parts other than the power control unit 250 among the parts constituting the robot 200. FIG. 9 illustrates a power terminal 2901 to which power is supplied from the power control unit 250 and an input port 1101 of the processing unit 110 that receives the movement restriction signal transmitted from the sub-microcomputer 251 in order to illustrate a relationship between the power control unit 250 and the main functional unit 290.

Figure 22:
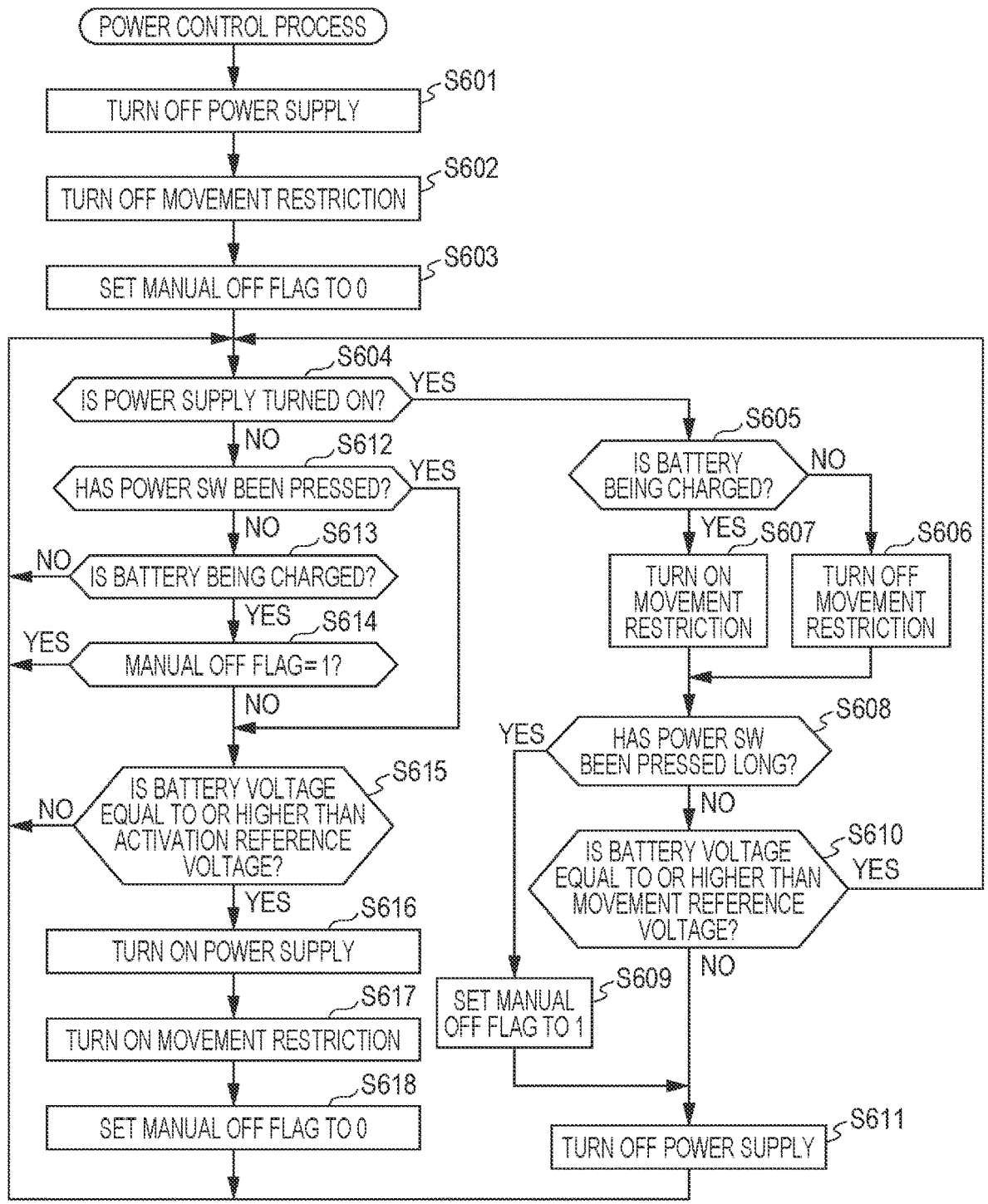
FIG. 22 is a flowchart of a power control process according to the embodiment.

Next, a power control process executed by the sub-microcomputer 251 of the power control unit 250 will be described with reference to FIG. 22. This process is started in a case where the sub-microcomputer 251 is activated (in a case where the voltage of the battery 253 becomes equal to or higher than a voltage at which the sub-microcomputer 251 can be started). In this process, a manual OFF flag variable indicating whether the user manually has pressed the power switch 241 long to turn off the power of the robot 200 is used.

First, the sub-microcomputer 251 outputs a power control signal instructing the power OFF to the power control IC 254 to turn off the power supply to the main functional unit 290 (step S601). Then, the sub-microcomputer 251 outputs a movement restriction signal instructing the movement restriction OFF to the processing unit 110 (step S602). Then, the sub-microcomputer 251 initializes the manual OFF flag variable to 0 (step S603).

Next, the sub-microcomputer 251 determines whether the power supply to the main functional unit 290 is turned on (step S604). If the power supply is turned on (step S604; Yes), the sub-microcomputer 251 determines whether the battery 253 is being charged (step S605). If the battery 253 is not being charged (step S605; No), the sub-microcomputer 251 outputs the movement restriction signal instructing the movement restriction OFF to the processing unit 110 (step S606), and proceeds to step S608.

If the battery 253 is being charged (step S605; Yes), the sub-microcomputer 251 outputs a movement restriction signal instructing the movement restriction ON to the processing unit 110 (step S607).

Then, the sub-microcomputer 251 determines whether the power switch 241 has been pressed long (step S608). If the power switch 241 has been pressed long (step S608; Yes), the sub-microcomputer 251 sets the manual OFF flag variable to 1 (step S609) and proceeds to step S611.

If the power switch 241 has not been pressed long (step S608; No), the sub-microcomputer 251 determines whether the voltage of the battery 253 is equal to or higher than the movement reference voltage (step S610). The movement reference voltage is a voltage considered to be the minimum necessary for the robot 200 to operate normally, and is, for example, a voltage that is 75% of a voltage in a case where the battery 253 is fully charged. Further, the movement reference voltage is also referred to as a second reference voltage.

If the voltage of the battery 253 is equal to or higher than the movement reference voltage (step S610; Yes), the sub-microcomputer 251 proceeds to step S604.

If the voltage of the battery 253 is lower than the movement reference voltage (step S610; No), the sub-microcomputer 251 outputs a power control signal instructing the power OFF to the power control IC 254 to turn off the power supply to the main functional unit 290, (step S611), and returns to step S604. In this manner, in a case where the voltage of the battery 253 becomes lower than the movement reference voltage, the power control unit 250 automatically turns off the power of the robot 200. Thus, it is possible to prevent the movement of the robot 200 from being unstable and prevent the battery 253 from being completely discharged.

On the other hand, if the power supply to the main functional unit 290 is not turned on in step S604 (step S604; No), the sub-microcomputer 251 determines whether the power switch 241 has been pressed (step S612). If the power switch 241 has been pressed (step S612; Yes), the sub-microcomputer 251 proceeds to step S615.

If the power switch 241 has not been pressed (step S612; No), the sub-microcomputer 251 determines whether the battery 253 is being charged (step S613). If the battery 253 is not being charged (step S613; No), the sub-microcomputer 251 returns to step S604.

If the battery 253 is being charged (step S613; Yes), the sub-microcomputer 251 determines whether the manual OFF flag is 1 (step S614). If the manual OFF flag is 1 (step S614; Yes), the sub-microcomputer 251 returns to step S604.

If the manual OFF flag variable is not 1 (step S614; No), the sub-microcomputer 251 determines whether the voltage of the battery 253 is equal to or higher than the activation reference voltage (step S615). The activation reference voltage is a voltage at which it can be determined that the power of the robot 200 may be automatically turned on during charging, and is, for example, a voltage that is 95% of the voltage in the case where the battery 253 is fully charged. Further, the activation reference voltage is also referred to as a first reference voltage.

If the voltage of the battery 253 is lower than the activation reference voltage (step S615; No), the sub-microcomputer 251 returns to step S604.

If the voltage of the battery 253 is equal to or higher than the activation reference voltage (step S615; Yes), the sub-microcomputer 251 outputs a power control signal instructing the power ON to the power control IC 254 to turn on the power supply to the main functional unit 290 (step S616). In this manner, in a case where the voltage of the battery 253 becomes equal to or higher than the activation reference voltage, the power control unit 250 automatically turns on the power of the robot 200. Thus, the user does not need to operate the power switch 241, and the feeling like a living thing of the robot 200 can be improved.

Next, the sub-microcomputer 251 outputs the movement restriction signal instructing the movement restriction ON to the processing unit 110 (step S617). Then, the sub-microcomputer 251 sets the manual OFF flag variable to 0 (step S618), and returns to step S604.

Through the above power control process, the robot 200 can not only automatically turn on and off the power, but also prevent the power from being automatically turned on during charging by the process of step S614 since the manual OFF flag variable is set to 1 in the case where the user manually turns off the power. As a result, if the user desires to shorten the charging time and manually turns off the power, the robot 200 can keep the power OFF during charging and shorten the charging time.

As can be seen from the above-described power control process, the sub-microcomputer 251 can discriminate whether a factor that causes cutoff of the power of the robot 200 is the user's operation (that the user manually has turned off the power) (manual OFF flag of 1) or other power cutoff factors (power OFF due to an event such as the voltage of the battery 253 being lower than the movement reference voltage and the like) (manual OFF flag of 0) by referring to the manual OFF flag variable.

Since the signal for turning on the movement restriction to the processing unit 110 is transmitted during the charging, it is possible to prevent the robot 200 from moving during charging and prohibiting the execution of the normal charging.

Specifically, in a case where the movement restriction is turned on, the following two movement restrictions are applied. The first movement restriction is a movement restriction for preventing the robot 200 from moving due to the momentum of the motor movement and separating the wireless power supply receiving circuit 255 and the wireless charging device 256. Specifically, the movement angles of the twist motor 221 and the up-and-down motor 222 are restricted to 50% of the movement angles specified in the motion table in the embodiment.

The second movement restriction is a movement restriction for preventing the robot 200 from floating from the wireless charging device 256 and separating the wireless power supply receiving circuit 255 and the wireless charging device 256. Specifically, the angle of the twist motor 221 is fixed to 0 degrees, and the angle of the up-and-down motor 222 is restricted to the range of 0 degrees to +30 degrees in the embodiment.

Even in the case where the movement restriction is turned off, the angles of the respective motors are restricted by structural constraints of the robot 200 in order to prevent an accident in which the head 204 and the body 206 collide with each other or a finger is sandwiched between the head 204 and the body 206. Specifically, the angle of the twist motor 221 is restricted to the range of −90 degrees to +90 degrees, and the angle of the up-and-down motor 222 is restricted to the range of −60 degrees to +60 degrees in the embodiment.

For example, in the case of "spontaneous movement 0-0 (breathing movement)" illustrated in FIG. 14, the rotation angles of the respective motors are restricted such that the angle of the up-and-down motor 222 after a lapse of 750 milliseconds is 15 degrees and the angle of the up-and-down motor after a lapse of 800 milliseconds is 12 degrees in the case where the movement restriction is turned on.

Figure 23:
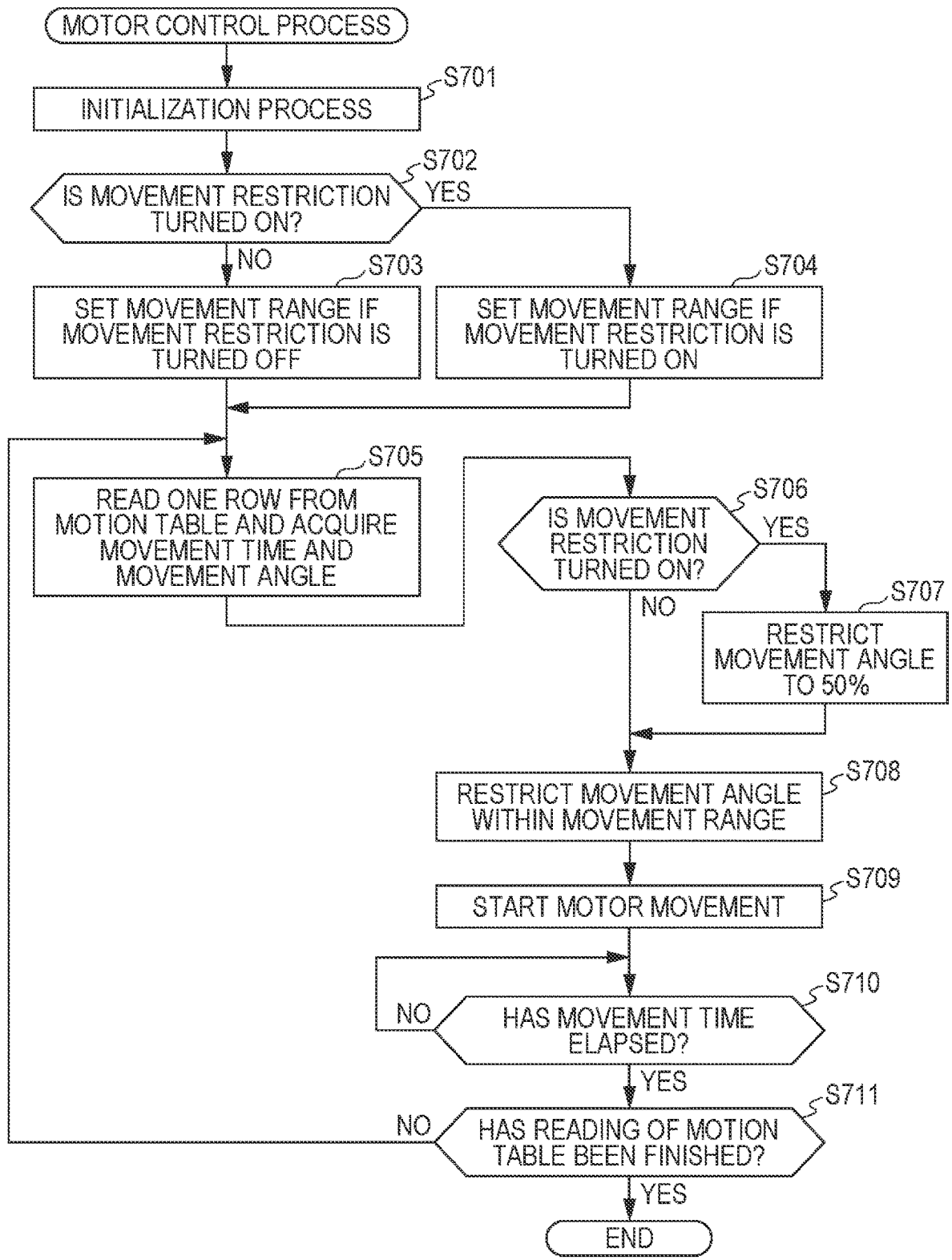
FIG. 23 is a flowchart of a motor control process according to the embodiment.

The motor control process including the above movement restriction will be described with reference to FIG. 23. This process is executed in a case where the processing unit 110 controls the drive unit 220 in step S208 of the movement selection process, in step S407 of the alarm control process, and in step S530 of the hard sleep process step.

First, the processing unit 110 performs a motor control initialization process (step S701). For example, the angles of the twist motor 221 and the up-and-down motor 222 are returned to the reference angle (0 degree) as necessary.

Next, the processing unit 110 determines whether the movement restriction is turned on (step S702). The processing unit 110 can acquire whether the movement restriction is turned on or off from the above-described input port 1101 illustrated in FIG. 9.

If the movement restriction is not turned on (step S702; No), the processing unit 110 sets values during the movement restriction OFF as movement ranges (step S703). Specifically, the angle of the twist motor 221 is restricted to the range of −90 degrees to +90 degrees, and the angle of the up-and-down motor 222 is restricted to the range of −60 degrees to +60 degrees.

If the movement restriction is turned on (step S702; Yes), the processing unit 110 sets values during the movement restriction ON as the movement ranges (step S704). Specifically, the angle of the twist motor 221 is restricted to 0 degrees, and the angle of the up-and-down motor 222 is restricted to the range of 0 degrees to +30 degrees.

Then, the processing unit 110 reads one row of data from the motion table 125, and acquires the movement time, the movement angle of the twist motor 221, and the movement angle of the up-and-down motor 222 (step S705).

Then, the processing unit 110 determines whether the movement restriction is turned on again (step S706). If the movement restriction is turned on (step S706; Yes), the processing unit 110 restricts values of the movement angles acquired in step S705 to 50% (step S707), and proceeds to step S708.

If the movement restriction is turned off (step S706; No), the processing unit 110 restricts the movement angles within the movement ranges set in step S703 or step S704 (step S708).

Then, the processing unit 110 starts the movements of the motors by setting the movement angles determined in step S708 to the twist motor 221 and the up-and-down motor 222, respectively (step S709).

Then, the processing unit 110 determines whether the movement time read from the motion table 125 in step S705 has elapsed (step S710). If the movement time has not elapsed (step S710; No), the processing unit 110 returns to step S710 and waits for a lapse of the movement time.

If the movement time has elapsed (step S710; Yes), the processing unit 110 determines whether the reading of the motion table 125 has been finished (step S711). If the reading of the motion table 125 has not been finished (step S711; No), the processing unit 110 returns to step S705. In a case where the reading of the motion table 125 has been finished (step S711; Yes), the processing unit 110 ends the motor control process.

Through the above motor control process, the robot 200 can safely control the twist motor 221 and the up-and-down motor 222 regardless of the values set in the motion table 125. Further, the robot 200 can be prevented from moving or floating from the wireless charging device 256 by restricting the movement during charging, so that the wireless charging can be stably performed.

Modifications

The invention is not limited to the above-described embodiment, and various modifications and applications are possible. For example, for a user who considers that it is desirable that the character of the robot 200 not be corrected after completion of growth of the robot 200, step S112 of the movement control process may be omitted, and the character value may be calculated without being corrected in step S201 of the movement selection process. As a result, the character of the robot 200 can be completely fixed after the completion of growth of the robot 200.

Although the movement (movement time and movement angle) of the drive unit 220 of the robot 200 and the sound data are set in the above-described motion table 125, but only the movement of the drive unit 220 or only the sound data may be set. Further, control other than the movement of the drive unit 220 and the sound data may be set. As the control other than the movement of the drive unit 220 and the sound data, for example, control of a color or brightness of an LED to be lit is conceivable in a case where the output unit 230 of the robot 200 is provided with the LED. It suffices that at least one of the drive unit 220 and the output unit 230 is included as a controlled unit to be controlled by the processing unit 110. The output unit 230 may output only sound as the sound output unit, or may output only light using the LED or the like.

In the above-described embodiment, the size of the emotion map 300 is expanded by 2 for both the maximum value and the minimum value of the emotion map 300 every time the days of simulated growth of the robot 200 increase by one day in the first period. However, the size of the emotion map 300 is not necessarily expanded uniformly in this manner. For example, the way of expanding the emotion map 300 may be changed according to how the emotion data 121 changes.

In order to change the way of expanding the emotion map 300 according to how the emotion data 121 changes, for example, the following processing may be performed in step S114 of the movement control process (FIG. 15). If the value of the emotion data 121 has been set to the maximum value of the emotion map 300 even once in step S105 during a certain day, the maximum value of the emotion map 300 is increased by 3 in the subsequent step S114. If the value of the emotion data 121 has not reached the maximum value of the emotion map 300 even once in step S105, the maximum value of the emotion map 300 is increased by 1 in the subsequent step S114.

Similarly, for the minimum value of the emotion map 300, the minimum value of the emotion map 300 is decreased by 3 if the value of the emotion data 121 has been set to the minimum value of the emotion map 300 even once in the day, and the minimum value of emotion map 300 is decreased by 1 if the value of the emotion data 121 has not reached the minimum value of emotion map 300 even once. Since the way of expanding the emotion map 300 is changed in this manner, the settable range of the emotion data 121 is learned according to the external stimulus.

Although the emotion map 300 is constantly expanded in the first period in the above-described embodiment and modifications, the change of the range of the emotion map 300 is not limited to the expansion. For example, the range of the emotion map 300 may be reduced in a direction of an emotion that rarely occurs in response to an external stimulus.

Figure 24:
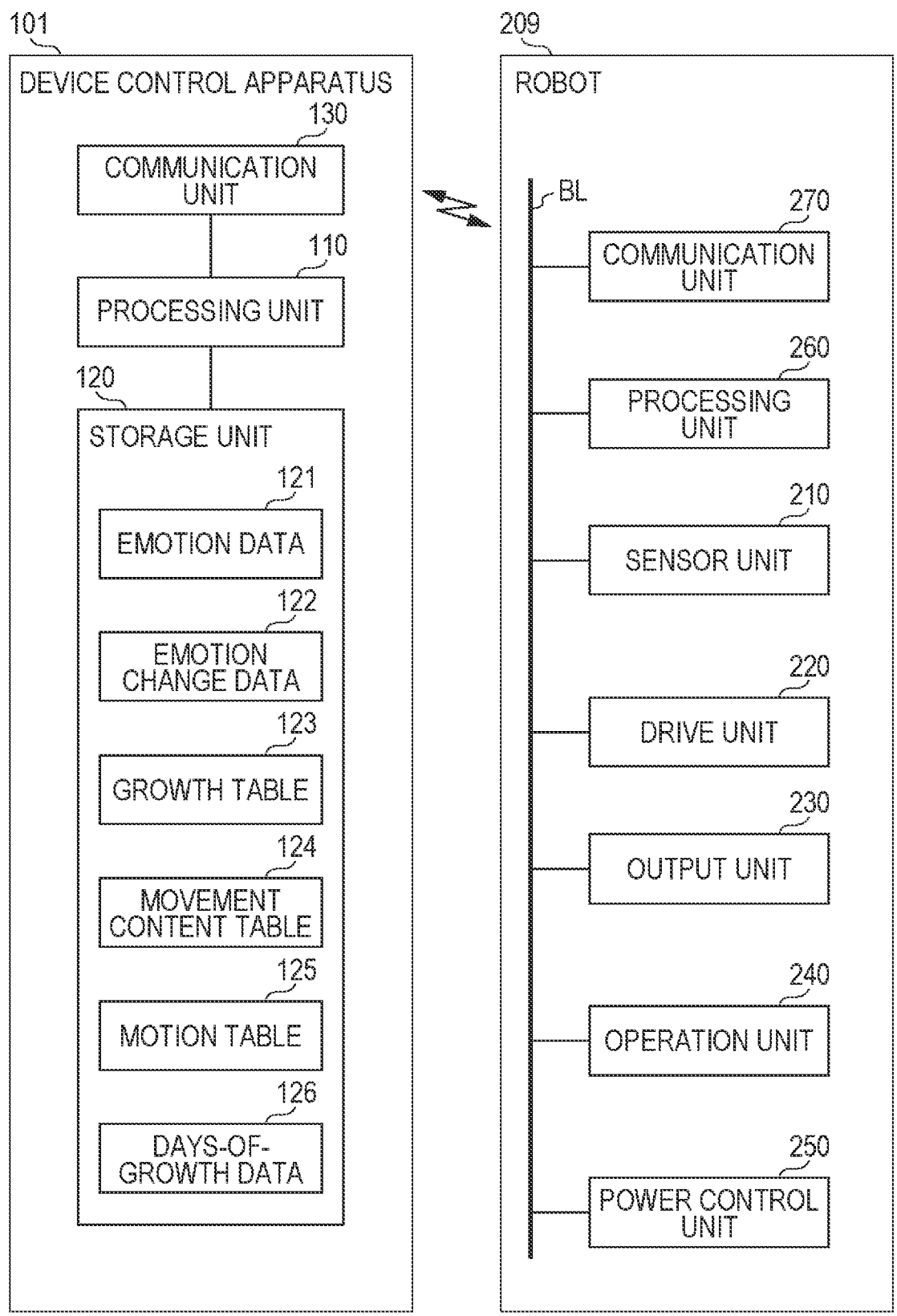
FIG. 24 is a block diagram illustrating functional configurations of a device control apparatus and a robot according to a modification.

Although the above-described embodiment adopts the configuration in which the robot 200 incorporates the device control apparatus 100, the device control apparatus 100 is not necessarily incorporated in the robot 200. For example, as illustrated in FIG. 24, a device control apparatus 101 may be configured as a separate apparatus (for example, a server) without being incorporated in a robot 209. In this modification, the robot 209 also includes a processing unit 260 and a communication unit 270, and is configured such that the communication unit 130 and the communication unit 270 can transmit and receive data to and from each other. Then, the processing unit 110 acquires an external stimulus detected by the sensor unit 210 and controls the drive unit 220 and the output unit 230 via the communication unit 130 and the communication unit 270.

In the case where the device control apparatus 101 and the robot 209 are configured as separate apparatuses in this manner, the robot 209 may be controlled by the processing unit 260 if necessary. For example, a simple movement is controlled by the processing unit 260, and a complicated movement is controlled by the processing unit 110 via the communication unit 270.

Although the device control apparatuses 100 and 101 are control apparatuses in which devices to be controlled are the robots 200 and 209 in the above-described embodiment, but the devices to be controlled are not limited to the robots 200 and 209. As the device to be controlled, for example, a wristwatch or the like is also conceivable. For example, in a case where a wristwatch that can output a sound and includes an acceleration sensor is set as the device to be controlled, an impact applied to the wristwatch or the like that is detected by the acceleration sensor can be assumed as an external stimulus. Further, the motion table 125 can record sound data to be output in response to an external stimulus. Further, it is conceivable to update the emotion data 121 and the emotion change data 122 in response to the external stimulus, and output the sound data set in the motion table 125 based on the detected external stimulus or the emotion change data 122 (character) at that time.

Then, the wristwatch may have personality (a simulated character) depending on how a user handles the wristwatch. In other words, even if wristwatches have the same model number, one becomes a wristwatch with a happy character in a case of being handled carefully by a user, and the other becomes a wristwatch with a shy character in a case of being handled roughly.

In this manner, the device control apparatuses 100 and 101 can be applied to various devices without being limited to the robot. In the case where the device control apparatus 100 or 101 is applied to a device, the device can have the simulated emotions and characters, and further, the user can be made to feel like raising the device in a pseudo manner.

In the above-described embodiment, a movement program to be executed by the CPU of the processing unit 110 is stored in advance in the ROM or the like of the storage unit 120. However, the invention is not limited thereto, and the movement program, configured to execute the above-described various processes, may be mounted on an existing general-purpose computer or the like to function as a device equivalent to the device control apparatus 100 or 101 according to the above-described embodiment.

Such a program may be provided using any method, and may be, for example, distributed in the state of being stored in a computer-readable recording medium (a flexible disk, a compact disc (CD)-ROM, a digital versatile disc (DVD)-ROM, a magneto-optical disc (MO), a memory card, a USB memory, or the like). Alternatively, the program may be stored in a storage on a network such as the Internet and provided by being downloaded.

Further, in the case where the above processes are executed by sharing between an operating system (OS) and an application program or by cooperation between the OS and the application program, only the application program may be stored in a recording medium or a storage Further, the program may be superimposed on a carrier wave and distributed via a network. For example, the program may be posted on a bulletin board system (BBS) on a network and delivered via the network. Then, it may be configured such that the above processes can be executed by starting this program and executing the program in the same manner as other application programs under the control of an OS.

In addition, the processing unit 110 or 260 may be not only configured using one arbitrary processor, such as a single processor, a multiprocessor, and a multi-core processor, but also configured by combining these arbitrary processors with a processing circuit such as an application specific integrated circuit (ASIC) and a field-programmable gate array (FPGA).

The present invention allows for various embodiments and modifications without departing from the broad spirit and scope of the present invention. Further, the above-described embodiment is given for the description of the invention, and does not limit the scope of the invention. That is, the scope of the invention is indicated not by the embodiment but by the claims. Then, various modifications made within the scope of the claims and the equivalent meaning of the invention are considered to fall within the scope of the present invention.

What is claimed is:

1. A device control apparatus comprising
at least one processor configured to execute a program stored in at least one memory,
wherein the at least one processor
determines whether a predetermined condition related to a simulated growth degree of a device is satisfied, wherein the predetermined condition is satisfied in a case where the simulated growth degree of the device has reached a maximum degree such that an emotion map representing a range of intensity of simulated emotions of the device is fixed, the range of intensity of simulated emotions represented by the emotion map expanding during simulated growth of the device which takes place during a predetermined first period,
acquires external stimulus data representing an external stimulus externally applied to the device,
in a case where the predetermined condition is not satisfied, changes and sets basic character data according to a first condition based on the acquired external stimulus data,
in a case where the predetermined condition is satisfied, corrects the changed and set basic character data according to a second condition, different from the first condition and based on the acquired external stimulus data, to obtain corrected character data,
controls a movement of the device according to the changed and set basic character data in the case where the predetermined condition is not satisfied, and
controls a movement of the device according to the corrected character data obtained by the correction in the case where the predetermined condition is satisfied,
wherein
the at least one processor acquires an emotion change parameter for changing emotion data of the device based on the acquired external stimulus data and sets the emotion data within the range of intensity represented by the emotion map in accordance with the acquired emotion change parameter, a value of the emotion change parameter being initially set at a predetermined value,
the first condition is a condition that the emotion data has been set to a maximum value or a minimum value on the emotion map in accordance with emotion change parameters acquired within a given period,
in changing and setting the basic character data, the at least one processor determines whether the first condition has been met, and in a case where the first condition has been met, the at least one processor increases by a predetermined amount a value of the emotion change parameter corresponding to the emotion data that has been set to the maximum value or the minimum value on the emotion map within the given period, thereby performing learning of the emotion change data, and the at least one processor calculates character values from the learned emotion change data, to thereby change and set the basic character data.

2. The device control apparatus according to claim 1, wherein
the second condition is a condition related to an occurrence frequency of the simulated emotion of the device represented by the emotion data.

3. The device control apparatus according to claim 1, wherein
the at least one processor, in the case where the predetermined condition is satisfied, fixes the basic character data, changes and sets character correction data for correcting the basic character data according to the second condition, and controls the movement of the device according to character data obtained by correcting the fixed basic character data using the character correction data.

4. The device control apparatus according to claim 1, wherein
the predetermined condition is satisfied in a case where growth degree data representing the simulated growth degree of the device exceeds a predetermined value.

5. The device control apparatus according to claim 4, wherein
the growth degree data is data representing days of simulated growth of the device.

6. The device control apparatus according to claim 4, wherein
the growth degree data is data representing a number of acquisitions of the external stimulus data.

7. The device control apparatus according to claim 4, wherein
the basic character data includes a predetermined number of character values respectively representing degrees of different characters, and
the predetermined condition is satisfied in a case where a largest value among the character values is equal or more than a predetermined value.

8. A device control apparatus comprising:
at least one processor configured to execute a program stored in at least one memory,
wherein the at least one processor:
determines whether a predetermined condition related to a simulated growth degree of a device is satisfied, wherein the predetermined condition is satisfied in a case where the simulated growth degree of the device has reached a maximum degree such that an emotion map representing a range of intensity of simulated emotions of the device is fixed, the range of intensity of simulated emotions represented by the emotion map expanding during simulated growth of the device which takes place during a predetermined first period,
acquires external stimulus data representing an external stimulus externally applied to the device,
in a case where the predetermined condition is not satisfied, changes and sets basic character data according to a first condition based on the acquired external stimulus data,
in a case where the predetermined condition is satisfied, corrects the changed and set basic character data according to a second condition, different from the first condition and based on the acquired external stimulus data, to obtain corrected character data,
controls a movement of the device according to the changed and set basic character data in the case where the predetermined condition is not satisfied, and controls a movement of the device according to the corrected character data obtained by the correction in the case where the predetermined condition is satisfied
wherein
the at least one processor acquires an emotion change parameter for changing emotion data of the device based on the acquired external stimulus data and sets the emotion data within the range of intensity represented by the emotion map in accordance with the acquired emotion change parameter, a value of the emotion change parameter being initially set at a predetermined value,
the second condition is a condition based on a location of an area on the emotion map where the emotion data has been present for a longest time within a given period,
in correcting the changed and set basic data, the at least one processor calculates an area where the emotion data has been present for the longest time on the emotion map based on a history of change in the emotion data in the given period, and adjusts correction values for correcting the character data by increasing a correction value for correcting a character value corresponding to the area where the emotion data has been present for the longest time, and decreasing a correction value for a character value corresponding to an area on an opposite side of the emotion map, and the at least one processor calculates the corrected character data based on the set basic character data and the adjusted correction values.

9. A device control method executed by at least one processor, the method comprising:
determining whether a predetermined condition related to a simulated growth degree of a device is satisfied, wherein the predetermined condition is satisfied in a case where the simulated growth degree of the device has reached a maximum degree such that an emotion map representing a range of intensity of simulated emotions of the device is fixed, the range of intensity of simulated emotions represented by the emotion map expanding during simulated growth of the device which takes place during a predetermined first period;
acquiring external stimulus data representing an external stimulus externally applied to the device;
in a case where the predetermined condition is not satisfied, changing and setting basic character data according to a first condition based on the acquired external stimulus data;
in a case where the predetermined condition is not satisfied, correcting the changed and set basic character data according to a second condition, different from the first condition and based on the acquired external stimulus data, to obtain corrected character data;
controlling a movement of the device according to the changed and set basic character data in the case where the predetermined condition is not satisfied; and
controlling a movement of the device according to the character data obtained by the correction in the case where the predetermined condition is satisfied,
wherein
the method further comprises acquiring an emotion change parameter for changing emotion data of the device based on the acquired external stimulus data and setting the emotion data within the range of intensity represented by the emotion map in accordance with the acquired emotion change parameter, a value of the emotion change parameter being initially set at a predetermined value,
the first condition is a condition that the emotion data has been set to a maximum value or a minimum value on the emotion map in accordance with emotion change parameters acquired within a given period, and
in changing and setting the basic character data, the method comprises:
determining that the first condition has been met, and increasing by a predetermined amount a value of the emotion change parameter corresponding to the emotion data that has been set to the maximum value or the minimum value on the emotion map within the given period, thereby performing learning of the emotion change data, and
calculating character values from the learned emotion change data, to thereby change and set the basic character data.

10. A device control method executed by at least one processor, the method comprising:
determining whether a predetermined condition related to a simulated growth degree of a device is satisfied, wherein the predetermined condition is satisfied in a case where the simulated growth degree of the device has reached a maximum degree such that an emotion map representing a range of intensity of simulated emotions of the device is fixed, the range of intensity of simulated emotions represented by the emotion map expanding during simulated growth of the device which takes place during a predetermined first period;

acquiring external stimulus data representing an external stimulus externally applied to the device;

in a case where the predetermined condition is not satisfied, changing and setting basic character data according to a first condition based on the acquired external stimulus data;

in a case where the predetermined condition is not satisfied, correcting the changed and set basic character data according to a second condition, different from the first condition and based on the acquired external stimulus data, to obtain corrected character data;

controlling a movement of the device according to the changed and set basic character data in the case where the predetermined condition is not satisfied; and controlling a movement of the device according to the character data obtained by the correction in the case where the predetermined condition is satisfied, wherein the method further comprises acquiring an emotion change parameter for changing emotion data of the device based on the acquired external stimulus data and setting the emotion data within the range of intensity represented by the emotion map in accordance with the acquired emotion change parameter, a value of the emotion change parameter being initially set at a predetermined value, the second condition is a condition based on a location of an area on the emotion map where the emotion data has been present for a longest time within a given period, in correcting the changed and set basic data, the method comprises:

calculating an area where the emotion data has been present for the longest time on the emotion map based on a history of change in the emotion data in the given period, adjusting correction values for correcting the character data by increasing a correction value for correcting a character value corresponding to the area where the emotion data has been present for the longest time, and decreasing a correction value for a character value corresponding to an area on an opposite side of the emotion map, and calculating the corrected character data based on the set basic character data and the adjusted correction values.

11. A non-transitory recording medium storing a program for causing a computer to execute a process comprising:

determining whether a predetermined condition related to a simulated growth degree of a device is satisfied, wherein the predetermined condition is satisfied in a case where the simulated growth degree of the device has reached a maximum degree such that an emotion map representing a range of intensity of simulated emotions of the device is fixed, the range of intensity of simulated emotions represented by the emotion map expanding during simulated growth of the device which takes place during a predetermined first period;

acquiring external stimulus data representing an external stimulus externally applied to the device;

in a case where the predetermined condition is not satisfied, changing and setting basic character data according to a first condition based on the acquired external stimulus data;

in a case where the predetermined condition is satisfied, correcting the changed and set basic character data according to a second condition, different from the first condition and based on the acquired external stimulus data, to obtain corrected character data;

controlling a movement of the device according to the changed and set basic character data in the case where the predetermined condition is not satisfied; and controlling a movement of the device according to the character data obtained by the correction in the case where the predetermined condition is satisfied, wherein the process further comprises acquiring an emotion change parameter for changing emotion data of the device based on the acquired external stimulus data and setting the emotion data within the range of intensity represented by the emotion map in accordance with the acquired emotion change parameter, a value of the emotion change parameter being initially set at a predetermined value, the first condition is a condition that the emotion data has been set to a maximum value or a minimum value on the emotion map in accordance with emotion change parameters acquired within a given period, and in changing and setting the basic character data, the process comprises:

determining that the first condition has been met, and increasing by a predetermined amount a value of the emotion change parameter corresponding to the emotion data that has been set to the maximum value or the minimum value on the emotion map within the given period, thereby performing learning of the emotion change data, and calculating character values from the learned emotion change data, to thereby change and set the basic character data.

12. A non-transitory recording medium storing a program for causing a computer to execute a process comprising:

determining whether a predetermined condition related to a simulated growth degree of a device is satisfied, wherein the predetermined condition is satisfied in a case where the simulated growth degree of the device has reached a maximum degree such that an emotion map representing a range of intensity of simulated emotions of the device is fixed, the range of intensity of simulated emotions represented by the emotion map expanding during simulated growth of the device which takes place during a predetermined first period;

acquiring external stimulus data representing an external stimulus externally applied to the device;

in a case where the predetermined condition is not satisfied, changing and setting basic character data according to a first condition based on the acquired external stimulus data;

in a case where the predetermined condition is satisfied, correcting the changed and set basic character data according to a second condition, different from the first condition and based on the acquired external stimulus data, to obtain corrected character data;

controlling a movement of the device according to the changed and set basic character data in the case where the predetermined condition is not satisfied; and controlling a movement of the device according to the character data obtained by the correction in the case where the predetermined condition is satisfied, wherein the process further comprises acquiring an emotion change parameter for changing emotion data of the device based on the acquired external stimulus data and setting the emotion data within the range of intensity represented by the emotion map in accordance with the acquired emotion change parameter, a value of the emotion change parameter being initially set at a predetermined value, the second condition is a condition based on a location of an area on the emotion map where the emotion data has been present for a longest time within a given period, in correcting the changed and set basic data, the process comprises:

calculating an area where the emotion data has been present for the longest time on the emotion map based on a history of change in the emotion data in the given period, adjusting correction values for correcting the character data by increasing a correction value for correcting a character value corresponding to the area where the emotion data has been present for the longest time, and decreasing a correction value for a character value corresponding to an area on an opposite side of the emotion map, and calculating the corrected character data based on the set basic character data and the adjusted correction values.

\* \* \* \* \*